United States Patent
Kang

(10) Patent No.: US 9,332,301 B2
(45) Date of Patent: May 3, 2016

(54) MULTIMEDIA DEVICE AND METHOD FOR DISPLAYING ADVERTISEMENT BROADCASTING THEREOF

(71) Applicant: LG ELECTRONICS INC., Seoul (KR)

(72) Inventor: Sungsuk Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/591,974

(22) Filed: Jan. 8, 2015

(65) Prior Publication Data

US 2015/0195608 A1 Jul. 9, 2015

(30) Foreign Application Priority Data

Jan. 9, 2014 (KR) .................. 10-2014-0002871

(51) Int. Cl.
| | |
|---|---|
| *H04N 7/10* | (2006.01) |
| *H04N 21/431* | (2011.01) |
| *H04N 21/81* | (2011.01) |
| *H04N 21/439* | (2011.01) |
| *H04N 21/44* | (2011.01) |

(52) U.S. Cl.
CPC ....... *H04N 21/4316* (2013.01); *H04N 21/4312* (2013.01); *H04N 21/4394* (2013.01); *H04N 21/44008* (2013.01); *H04N 21/812* (2013.01)

(58) Field of Classification Search
CPC .................... H04N 21/4316; H04N 21/23424
See application file for complete search history.

(56) References Cited

U.S. PATENT DOCUMENTS

| | | | | |
|---|---|---|---|---|
| 2002/0087979 A1* | 7/2002 | Dudkiewicz et al. | ............ | 725/34 |
| 2002/0176702 A1* | 11/2002 | Frantz | ............ | 386/108 |
| 2002/0194595 A1* | 12/2002 | Miller et al. | ............ | 725/36 |
| 2003/0115595 A1* | 6/2003 | Stevens | ............ | H04N 7/163 725/32 |
| 2007/0226762 A1* | 9/2007 | Girgis et al. | ............ | 725/33 |
| 2008/0062318 A1* | 3/2008 | Ellis et al. | ............ | 348/564 |
| 2008/0086456 A1* | 4/2008 | Rasanen et al. | ............ | 707/3 |
| 2010/0281499 A1* | 11/2010 | Harville | ............ | 725/32 |
| 2014/0289764 A1* | 9/2014 | Mallika | ............ | H04N 21/2402 725/34 |
| 2015/0032517 A1* | 1/2015 | Pan | ............ | 705/14.4 |

* cited by examiner

*Primary Examiner* — Junior Mendoza
(74) *Attorney, Agent, or Firm* — Ked & Associates LLP

(57) ABSTRACT

Disclosed are a multimedia device that may simultaneously display advertisement broadcasting of a current viewing channel and another channel broadcasting when advertisement broadcasting starts in the current viewing channel, and a method for displaying advertisement broadcasting thereof. The multimedia device, which includes a display screen of a predetermined picture ratio, comprises a receiver receiving a digital broadcast signal that includes a broadcasting program and an advertising program; a decoder decoding the digital broadcast signal; and an advertising/broadcasting program switching module splitting the display screen into a first screen and a second screen if the advertising program is detected from a current channel, displaying the advertising program of the current channel on the split second screen and at the same time displaying a predetermined content on the first screen, incorporating the split first and second screens into one screen if the advertising program ends from the current channel, and displaying the broadcasting program of the current channel on the one screen.

20 Claims, 20 Drawing Sheets

MULTIMEDIA DEVICE AND METHOD FOR DISPLAYING ADVERTISEMENT BROADCASTING THEREOF

CROSS REFERENCE TO RELATED APPLICATION

This application claims priority under 35 U.S.C. §119 to Korean Application No. 10-2014-0002871, filed in Korea on 9 Jan., 2014 which is hereby incorporated in its entirety by reference as if fully set forth herein.

BACKGROUND OF THE INVENTION

1. Field of the Invention

The present invention relates to a multimedia device, and more particularly, to a multimedia device that may simultaneously display advertisement broadcasting of a current viewing channel and another channel broadcasting when advertisement broadcasting starts in the current viewing channel, and a method for displaying advertisement broadcasting thereof.

2. Discussion of the Related Art

Generally, a multimedia device is a device that receives and processes broadcasting images that may be viewed by a user.

Also, the multimedia device may display broadcasting, which is selected by a user from broadcasting signals transmitted from a broadcasting station, on a display.

The current worldwide tendency is towards digital broadcasting from analog broadcasting.

Digital broadcasting means that digital video and audio signals are transmitted. Since digital broadcasting is robuster to external noise than analog broadcasting, digital broadcasting little causes data loss, is more favorable for error correction, has high resolution, and provides definite picture image.

Also, digital broadcasting enables bidirectional services unlike analog broadcasting.

Recently, the multimedia device has higher throughput and multiple functions to use digital broadcasting as compared with a conventional multimedia device, and provides various services such as Internet service, video on demand (VOD) service and electronic album service, whereby the current trend of the multimedia device is gradually towards a large scaled screen.

Meanwhile, it is general that service providers such as a broadcasting station provide various advertising programs between broadcasting programs to improve a profit structure, etc.

Particularly, it is likely that advertising programs are concentrated on a prime time or a popular broadcasting program considering advertising effect, whereby a viewer has no option but to view a plurality of advertising programs to view a desired broadcasting program.

In this case, a viewer who does not desire to view advertising programs does something else for the time when the advertising programs are being provided, or switches a current viewing channel to another channel, whereby inconvenience occurs in that the viewer fails to view the desired broadcasting program timely at a start time of the desired broadcasting program.

Accordingly, development of a multimedia device has been requested, which may satisfy all of a viewer, a broadcasting station and an advertiser by simultaneously displaying advertisement broadcasting of a current viewing channel and another channel broadcasting when advertisement broadcasting starts in the current viewing channel.

SUMMARY OF THE INVENTION

Accordingly, the present specification is directed to a multimedia device and a method for displaying advertisement broadcasting thereof, which substantially obviate one or more problems due to limitations and disadvantages of the related art.

An object of the present specification is to provide a multimedia device and a method for displaying advertisement broadcasting thereof, in which a display screen is split, if an advertising program starts in a current viewing channel, to display an advertising program of the current channel on some screen area and at the same time display a predetermined content on another screen area, thereby providing a viewer with fun and convenience even in the middle of advertisement and providing an advertiser and a broadcasting station with a screen area for various advertisement related information without skipping advertisement.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the invention, as embodied and broadly described herein, a method for displaying advertisement broadcasting of a multimedia device, which includes a display screen of a predetermined picture ratio, comprises the steps of displaying a broadcasting program of a current channel, which is received, on the display screen; splitting the display screen into a first screen and a second screen if an advertising program is detected from the current channel; displaying the advertising program of the current channel on the split second screen and at the same time displaying a predetermined content on the first screen; incorporating the split first and second screens into one screen if the advertising program ends from the current channel; and displaying the broadcasting program of the current channel on the one screen.

In another aspect of the present invention, a multimedia device, which includes a display screen of a predetermined picture ratio, comprises a receiver receiving a digital broadcast signal that includes a broadcasting program and an advertising program; a decoder decoding the digital broadcast signal; and an advertising/broadcasting program switching module splitting the display screen into a first screen and a second screen if the advertising program is detected from a current channel, displaying the advertising program of the current channel on the split second screen and at the same time displaying a predetermined content on the first screen, incorporating the split first and second screens into one screen if the advertising program ends from the current channel, and displaying the broadcasting program of the current channel on the one screen.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Figure 1:
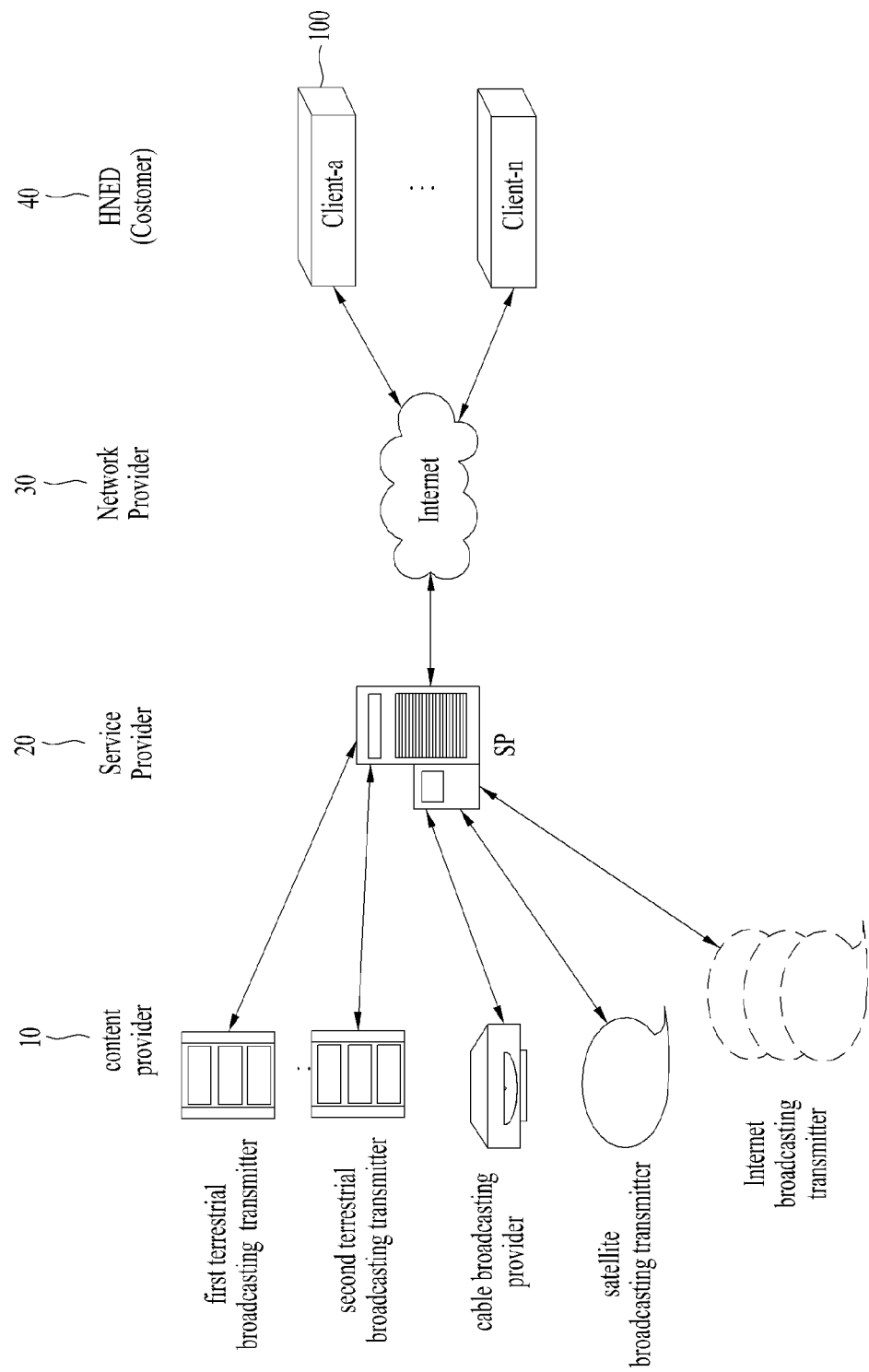
FIG. 1 is a diagram briefly illustrating a broadcast system that includes a multimedia device according to the present invention.

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other. Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" means that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Meanwhile, a multimedia device disclosed in this specification corresponds to an intelligent multimedia device that additionally provides a computer support function in addition to a broadcasting receiving function. Accordingly, as the multimedia device is provided with Internet function additionally to a broadcasting receiving function, the multimedia device may be provided with a more convenient interface such as a manual input unit, a touch screen or a spatial remote controller.

Also, the multimedia device enables e-mailing, web browsing, banking or games by accessing Internet or computer in accordance with the support of wire or wireless Internet function. For these various functions, a standardized general-purpose operating system (OS) may be used.

Accordingly, since the multimedia device disclosed in the present invention may freely be provided with or delete various applications on a general-purpose OS kernel, the multimedia device may perform user-friendly various functions.

More detailed examples of the multimedia device may include a network TV, HBBTV, and a smart TV, and the multimedia device may be applied to a smart phone as the case may be.

FIG. 1 is a diagram briefly illustrating a broadcast system that includes a multimedia device according to the present invention.

Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
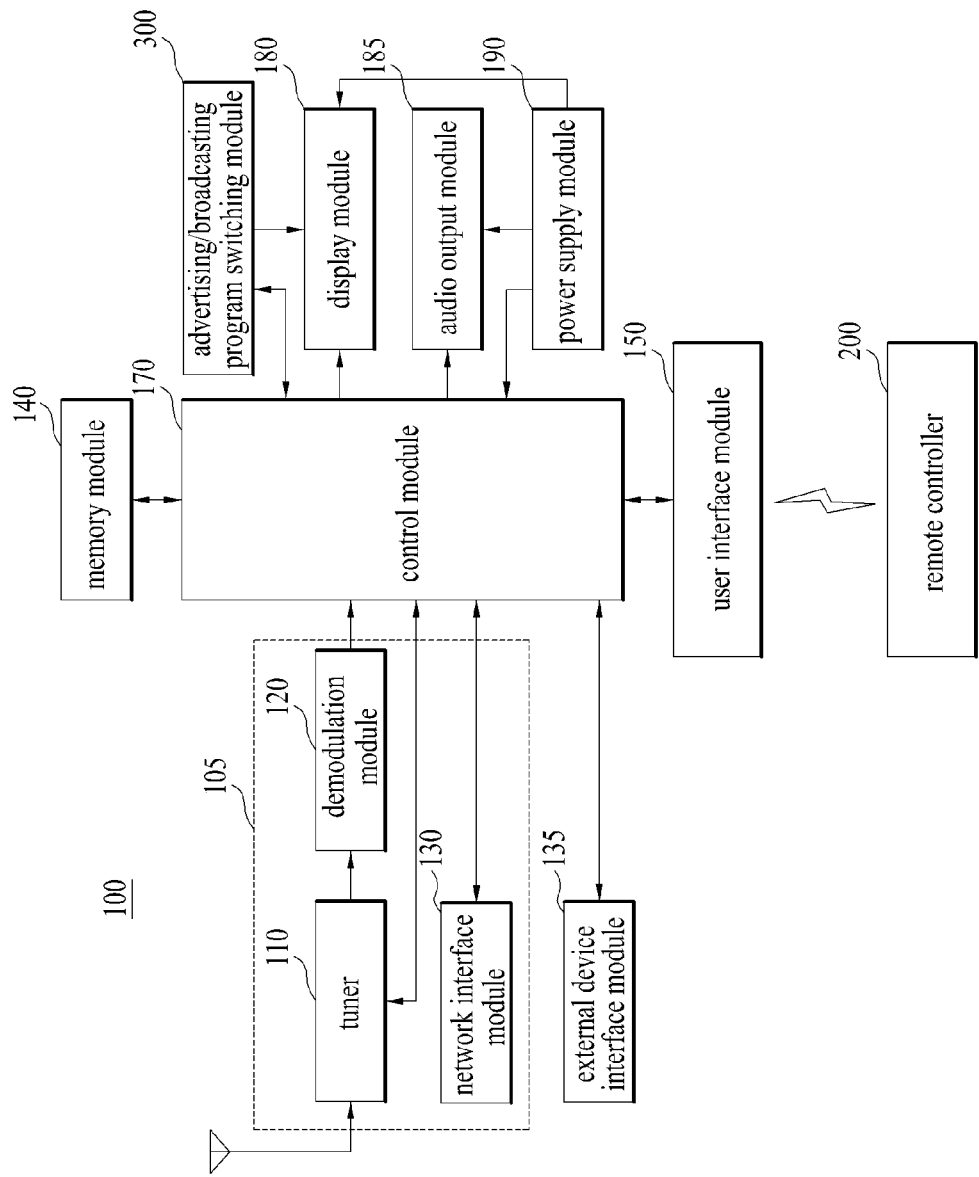
FIG. 2 is a block diagram illustrating a multimedia device of FIG. 1.

FIG. 2 is a block diagram illustrating a multimedia device of FIG. 1.

As shown in FIG. 2, the multimedia device 100 may include a broadcasting receiving module 105, an external device interface module 135, a memory module 140, a user input interface module 150, a control module 170, a display module 180, an audio output module 185, a power supply module 190, and an advertising/broadcasting program switching module 300.

The broadcasting receiving module 105 may include a tuner 110, a demodulation module 120, and a network interface module 130.

The broadcasting receiving module 105 may be designed to include the tuner 110 and the demodulation module 120 without the network interface module 130 if necessary. On the other hand, the broadcasting receiving module 150 may be designed to include only the network interface module 130 without the tuner 110 and the demodulation module 120.

At this time, the tuner 110 may select one of radio frequency (RF) broadcast signals received through an antenna, which corresponds to a channel selected by a user or all previously stored channels. Also, the tuner 110 may convert the selected RF broadcast signal to an intermediate frequency signal or a baseband video or audio signal.

Subsequently, the tuner 110 may receive RF broadcast signal of a single carrier based on an advanced television system committee (ATSC) mode or RF broadcast signal of multiple carriers based on a digital video broadcasting (DVB) mode.

A plurality of tuners 110 may be provided to simultaneously receive multiple channels as the case may be.

Next, the demodulation module 120 may output a stream signal (TS) after performing demodulation and channel decoding.

The stream signal output from the demodulation module 120 may be input to the control module 170. The control module 170 may output video to the display module 180 and output audio to the audio output module 185 after performing demultiplexing, video/audio signal processing.

Subsequently, the external device interface module 135 may connect an external device to the multimedia device 100.

In this case, the external device interface module 135 may be connected to the external device such as Digital Versatile Disks (DVD), Blu-rays, game devices, cameras, camcorders, computers (e.g., notebook computers), etc. through wire/wireless cables.

The external device interface module 135 may forward the video, audio, or data signal, which is externally input through the external device connected thereto, to the control module 170 of the multimedia device 100. Also, the external device interface module 135 may output the video, audio or data signal processed by the control module 170 to the external device.

To this end, the external device interface module 135 may include an NV input/output module (not shown) or a wireless communication module (not shown).

The A/V input/output module may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the multimedia device 100.

The wireless communication module may perform short range wireless communication with other electronic devices. Subsequently, the multimedia device 100 may be connected with the other electronic devices through the network in accordance with the communication standards such as Bluetooth, Radio Frequency Identification (RFID), infrared Data Association (IrDA), Ultra Wideband (UWB), ZigBee, Digital Living Network Alliance (DLNA), etc.

Also, the external device interface module 135 may be connected to various set-top boxes through at least one of the above-mentioned various terminals to perform input/output operation with the set-top boxes.

The network interface module 130 provides an interface for connecting the multimedia device 100 with wire/wireless networks including Internet network. The network interface module 130 may include an Ethernet terminal, for example, for wire network connection. For example, Wireless LAN (WLAN)(Wi-Fi), Wireless broadband (Wibro), World Interoperability for Microwave Access (Wimax), High Speed Downlink Packet Access (HSDPA) may be used for the wireless network connection.

Subsequently, the network interface module 130 may transmit or receive data to or from another user or another electronic device through the connected network or another network linked to the connected network.

Next, the memory module 140 may store a program for processing and controlling each signal of the control module 170, or may store the processed video, audio or data signal therein.

Also, the memory module 140 may temporarily store the video, audio or data signal input from the external device interface module 135 or the network interface module 130. The memory module 140 may also store information on a predetermined broadcast channel through a channel memory function.

In this case, the memory module 140 may include a storage medium of at least one type of a flash memory type, a hard disk type, a multimedia card micro type, a card type memory (for example, SD or XD memory), RAM and ROM (EEPROM, etc.).

The multimedia device 100 may play contents files (moving picture files, still image files, music files, document files, application files, etc.) stored in the memory module 140 to provide the played contents files to the user.

Although FIG. 2 illustrates that the memory module 140 is provided separately from the control module 170, the scope of the present invention is not limited by the embodiment of FIG. 2. The memory module 140 may be included in the control module 170.

Also, the user input interface module 150 may forward the signal input by the user to the control module 170 or forward the signal from the control module 170 to the user.

For example, the user input interface module 150 may receive a control signal such as power on/off, channel selection and screen setup from a remote controller 200 and gesture and audio information input through the remote controller 200 in accordance with various communication modes such as RF communication mode and IR communication mode, or may transmit the control signal from the control module 170 to the remote controller 200.

Also, for example, the user input interface module 150 may forward a control signal input by a local key (not shown) such as a power key, a channel key, a volume key, and a setup key to the control module 170.

Next, the control module 170 may demultiplex streams input through the tuner 110, the demodulation module 120 or the external device interface module 135 and generate and output signals for video and audio output by processing the demultiplexed streams.

The video signal video-processed by the control module 170 may be input to the display module 180 and then displayed as a video corresponding to the corresponding video signal.

Also, the video signal video-processed by the control module 170 may be input to the external output device through the external device interface module 135.

The audio signal processed by the control module 170 may be output to the audio output module 185. Also, the audio signal processed by the control module 170 may be input to the external output device through the external device interface module 135.

Subsequently, if there is a request signal for advertising/broadcasting program switching from the advertising/broadcasting program switching module 300, the control module 170 may control some function of the multimedia device to perform a command corresponding to the request signal.

The advertising/broadcasting program switching module 300 may include an advertising program detector, a screen splitter, a screen composition module, a storage module for storing screen split related information and screen composition related information, and a controller for advertising/broadcasting program switching.

Also, the advertising/broadcasting program switching module 300 may further include a user interface manager and a service manager.

In this case, the advertising program detector may include a black frame detector, a scene change detector, a silence detector, an EPG detector, and an advertisement start/end determination module.

For example, the black frame detector may detect information on a black frame from video data decoded by a video decoder and transmit the detected information to the advertisement start/end determination module.

The scene change detector may detect information on a scene change from the video data decoded by the video decoder and transmit the detected information to the advertisement start/end determination module.

Also, the silence detector may detect information on audio silence from audio data decoded by an audio decoder and transmit the detected information to the advertisement start/end determination module.

Subsequently, the EPG detector may detect EPG information from EPG data decoded by a data decoder and transmit the detected information to the advertisement start/end determination module.

Next, the advertisement start/end determination module may determine advertisement start or end on the basis of the information detected from the back frame detector, the scene change detector, the silence detector and the EPG detector, and transmit the determined result to the controller for advertising/broadcasting program switching.

The screen splitter of the advertising/broadcasting program switching module 300 may split a display screen into a first screen and a second screen if the advertising program is detected.

Also, the screen splitter may re-split the second screen into a plurality of sub screens when splitting the display screen into the first screen and the second screen.

In this way, the screen splitter may split the display screen in accordance with split information which is previously set.

As the case may be, the screen splitter may provide the user with information on screen split by configuring a user interface for screen split through the user interface manager if the advertising program is detected, and may split the screen in accordance with screen split information selected by the user.

Next, the screen composition module may variously set programs displayed on the split screens if the display screen is split.

In this case, the screen composition module may display programs corresponding to the split screens in accordance with screen composition information which is previously set.

As the case may be, the screen composition module may provide the user with information on screen composition by configuring a user interface for screen composition through the user interface manager, and may compose the screen in accordance with screen composition information selected by the user.

For example, the screen composition module may compose the split screens to display an advertising program of a current channel on the split second screen and at the same time display a predetermined content on the first screen.

In this case, if the split second screen includes first and second sub screens, the screen composition module may compose the split screens to display the advertising program of the current channel on the first sub screen and display a predetermined advertisement related content on the second sub screen.

As the case may be, the screen composition module may display a content related to the advertising program displayed on the first sub screen, on the second sub screen.

The screen composition module may display at least one of a broadcasting program of another channel, a download application, external video, recorded video, web site, and SNS on the first screen when displaying a predetermined content on the first screen.

Also, the screen splitter of the advertising/broadcasting program switching module 300 may incorporate the split first and second screens into one screen if the advertising program ends from the current channel.

The screen composition module of the advertising/broadcasting program switching module 300 may display the broadcasting program of the current channel, which is received on the incorporated screen, if the advertising program ends from the current channel.

Subsequently, the storage module of the advertising/broadcasting program switching module 300 may store screen split information which is previously set, screen split information selected by the user, screen composition information which is previously set, and screen composition information selected by the user.

Next, the controller of the advertising/broadcasting program switching module 300 may control the advertising program detector, the screen splitter, the screen composition module and the storage module to split the display screen into the first and second screens if the advertising program is detected, display the advertising program of the current channel on the split second screen and at the same time display a predetermined content on the first screen, incorporate the split first and second screens into one screen if the advertising program ends from the current channel and display the received advertising program of the current channel on one screen.

In this case, the controller of the advertising/broadcasting program switching module 300 may perform automatic switching of the advertising/broadcasting programs by directly controlling the function of the multimedia device.

Also, the controller of the advertising/broadcasting program switching module 300 may provide the user with advertising/broadcasting program switching related GUI (Graphic User Interface) by controlling the user interface manager and the service manager.

In this case, the user interface manager may provide a GUI for the user by using OSD (On Screen Display).

The service manager may perform advertising/broadcasting program switching related service by controlling a service associated manager such as a service transfer manager, a service discovery manager, a service control manager and a meta data manager.

Subsequently, the display module 180 generates driving signals by respectively switching the video signal, the data signal, the OSD signal, which are processed by the controller 170, or the video signal and the data signal, which are received from the external device interface module 135, to R, G and B signals.

Subsequently, the audio output module 185 receives the audio signal processed by the controller 170, for example, stereo signal, 3.1 channel signal or 5.1 channel signal and outputs the received signal as audio. The audio output module 185 may be realized as various types of speakers.

Next, the power supply module 190 may supply a corresponding power to the entire of the multimedia device 100.

The remote controller 200 is intended to transmit a user input to the user interface module 150, and may use Bluetooth, RF (Radio Frequency) communication, Infrared Ray (IR) communication, UWB (Ultra WideBand), ZigBee mode, etc.

Also, the remote controller 200 may receive the video, audio or data signal output from the user interface module 150 and display the received signal or output audio or vibration.

The multimedia device 100 constituted as above may be a fixed type digital broadcast receiver that may receive at least one of ATSCH mode (8-VSB) digital broadcasting, DVB-T mode (COFDM mode) digital broadcasting, and IDSB-T mode (BST-OFDM mode) digital broadcasting.

As the case may be, the multimedia device 100 may not be provided with the tuner 110 and the demodulation module 120 shown in FIG. 2, and may receive video contents through the network interface module 130 or the external device interface module 135 and play the received video contents.

Also, the multimedia device 100 is a video signal processing device that performs signal processing for the video stored therein or externally input video, and may be a set-top box, a DVD player, a Blue ray player, a game device, or a computer, from which the display module 180 and the audio output module 185 shown in FIG. 2 are excluded.

Figure 3:
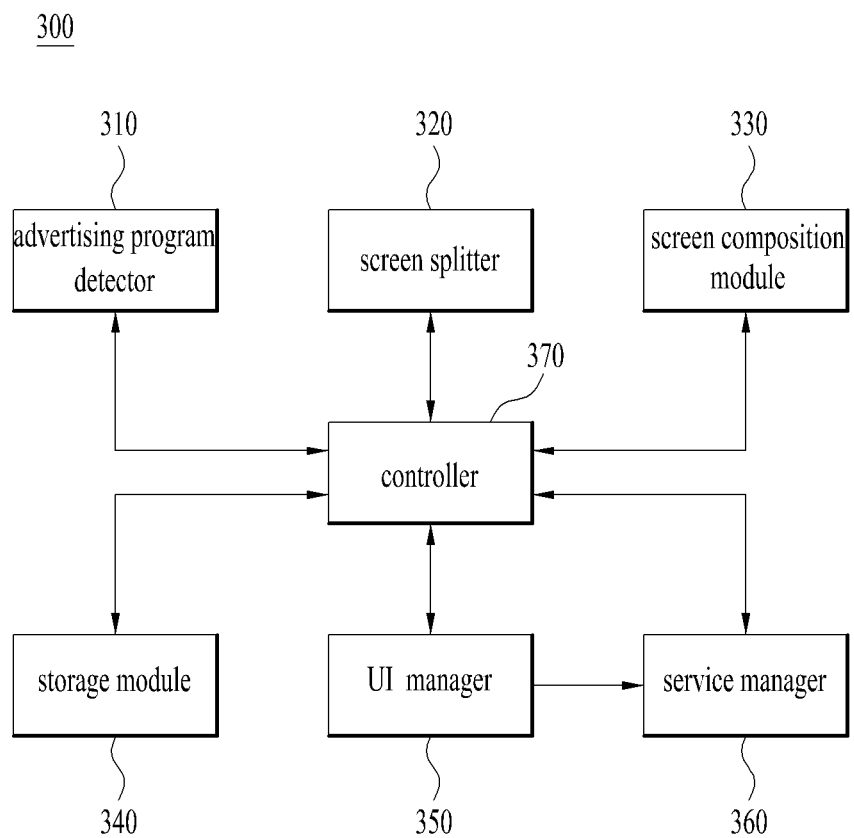
FIG. 3 is a block diagram illustrating an advertising/broadcasting program switching module of FIG. 2.

FIG. 3 is a block diagram illustrating an advertising/broadcasting program switching module of FIG. 2.

As shown in FIG. 3, the advertising/broadcasting program switching module 300 may include an advertising program detector 310, a screen splitter 320, a screen composition module 330, a storage module 340 for storing screen split related information and screen composition related information, and a controller 370 for advertising/broadcasting program switching.

Also, the advertising/broadcasting program switching module 300 may further include a user interface manager 350 and a service manager 360.

In this case, the advertising program detector 310 may include a black frame detector, a scene change detector, a silence detector, an EPG detector, and an advertisement start/end determination module.

For example, the black frame detector may detect information on a black frame from video data decoded by a video decoder and transmit the detected information to the advertisement start/end determination module.

The scene change detector may detect information on a scene change from the video data decoded by the video decoder and transmit the detected information to the advertisement start/end determination module.

Also, the silence detector may detect information on audio silence from audio data decoded by an audio decoder and transmit the detected information to the advertisement start/end determination module.

Subsequently, the EPG detector may detect EPG information from EPG data decoded by a data decoder and transmit the detected information to the advertisement start/end determination module.

Next, the advertisement start/end determination module may determine advertisement start or end on the basis of the information detected from the back frame detector, the scene change detector, the silence detector and the EPG detector, and transmit the determined result to the controller for advertising/broadcasting program switching.

The screen splitter 320 may split a display screen into a first screen and a second screen if the advertising program is detected from the advertising program detector 310.

In this case, an area of the first screen and an area of the second screen may be different from each other.

At this time, the area of the first screen may be, but not limited to, greater than that of the second screen.

For example, if a picture ratio of the entire screen is 21:9, the picture ratio of the first screen may be 16:9, and the picture ratio of the second screen may be 5:9.

Also, the screen splitter 320 may arrange the first screen and the second screen in parallel when splitting the display screen into the first screen and the second screen.

As another case, the screen splitter 320 may arrange the second screens at both sides of the first screen on the basis of the first screen when splitting the display screen into the first screen and the second screen.

In this case, the areas of the second screens arranged at both sides of the first screen may be the same as each other.

Also, the screen splitter 320 may re-split the second screen into a plurality of sub screens when splitting the display screen into the first screen and the second screen.

In this way, the screen splitter 320 may split the display screen in accordance with split information which is previously set.

As the case may be, the screen splitter 320 may provide the user with information on screen split by configuring a user interface for screen split through the user interface manager if the advertising program is detected, and may split the screen in accordance with screen split information selected by the user.

Next, the screen composition module 330 may variously set programs displayed on the split screens if the display screen is split.

In this case, the screen composition module 330 may display programs corresponding to the split screens in accordance with screen composition information which is previously set.

As the case may be, the screen composition module 330 may provide the user with information on screen composition by configuring a user interface for screen composition through the user interface manager, and may compose the screen in accordance with screen composition information selected by the user.

For example, the screen composition module 330 may compose the split screens to display an advertising program of a current channel on the split second screen and at the same time display a predetermined content on the first screen.

In this case, if the split second screen includes first and second sub screens, the screen composition module may compose the split screens to display the advertising program of the current channel on the first sub screen and display a predetermined advertisement related content on the second sub screen.

As the case may be, the screen composition module 330 may display a content related to the advertising program displayed on the first sub screen, on the second sub screen.

As another case, the screen composition module 330 may display another advertising program other than the advertising program displayed on the first sub screen, on the second sub screen.

Also, the screen composition module 330 may display at least one of a broadcasting program of another channel, a download application, external video, recorded video, web site, and SNS on the first screen when displaying a predetermined content on the first screen.

As the case may be, the screen composition module 330 may display a content of a channel having the same attribute as that of the channel of the broadcasting program prior to screen split on the first screen when displaying a predetermined content on the first screen.

As another case, the screen composition module 330 may display a content having the same genre as that of the broadcasting program prior to screen split on the first screen when displaying a predetermined content on the first screen.

As still another case, the screen composition module 330 may display a content having the highest ratings on the first screen by detecting xml type real time ratings data when displaying a predetermined content on the first screen.

As further still another case, the screen composition module 330 may display a content having a search keyword of the highest priority on the first screen by detecting xml type real time popular search keyword when displaying a predetermined content on the first screen.

Also, the screen splitter 320 may incorporate the split first and second screens into one screen if the advertising program ends from the current channel.

The screen composition module 330 may display the broadcasting program of the current channel, which is received on the incorporated screen, if the advertising program ends from the current channel.

Subsequently, the storage module 340 may store screen split information which is previously set, screen split information selected by the user, screen composition information which is previously set, and screen composition information selected by the user.

Next, the controller 370 may control the advertising program detector 310, the screen splitter 320, the screen composition module 330 and the storage module 340 to split the display screen into the first and second screens if the advertising program is detected, display the advertising program of the current channel on the split second screen and at the same time display a predetermined content on the first screen, incorporate the split first and second screens into one screen if the advertising program ends from the current channel and display the received advertising program of the current channel on one screen.

In this case, the controller 370 may perform automatic switching of the advertising/broadcasting programs by directly controlling the function of the multimedia device.

Also, the controller 370 may provide the user with advertising/broadcasting program switching related GUI (Graphic User Interface) by controlling the user interface manager 350 and the service manager 360.

In this case, the user interface manager 350 may provide a GUI for the user by using OSD (On Screen Display).

The service manager 360 may perform advertising/broadcasting program switching related service by controlling a service associated manager such as a service transfer manager, a service discovery manager, a service control manager and a meta data manager.

Figure 4:
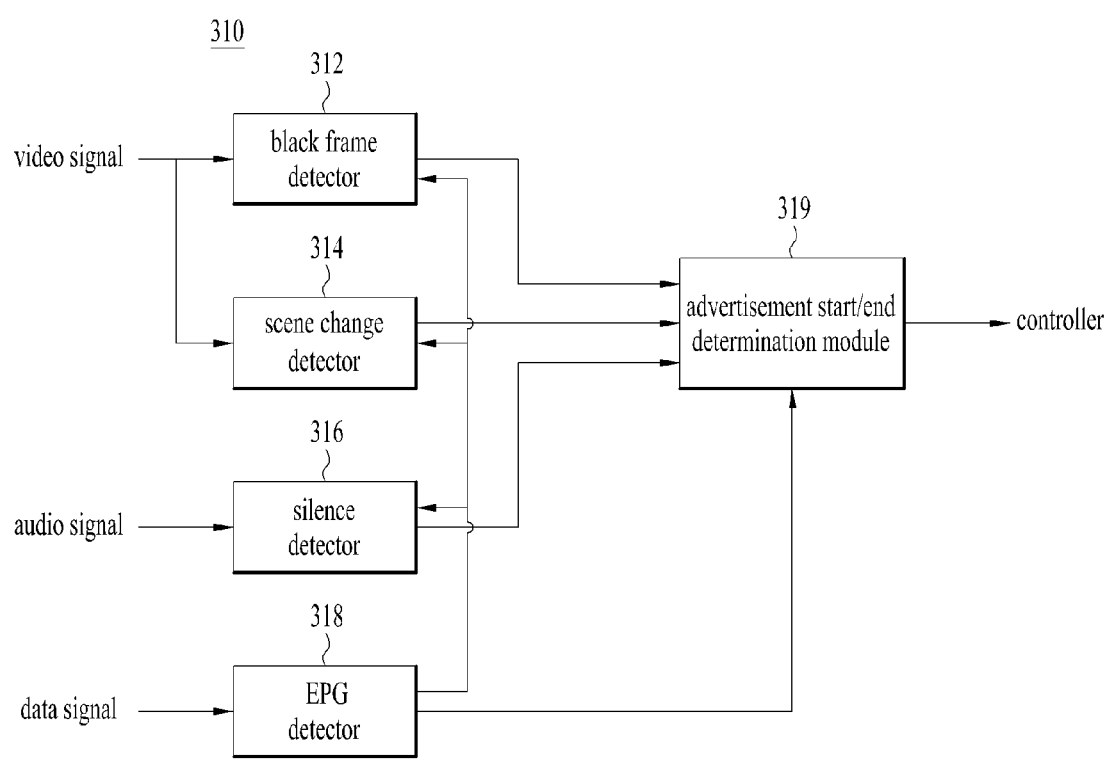
FIG. 4 is a block diagram illustrating an advertising program detector of FIG. 3.
Figure 5:
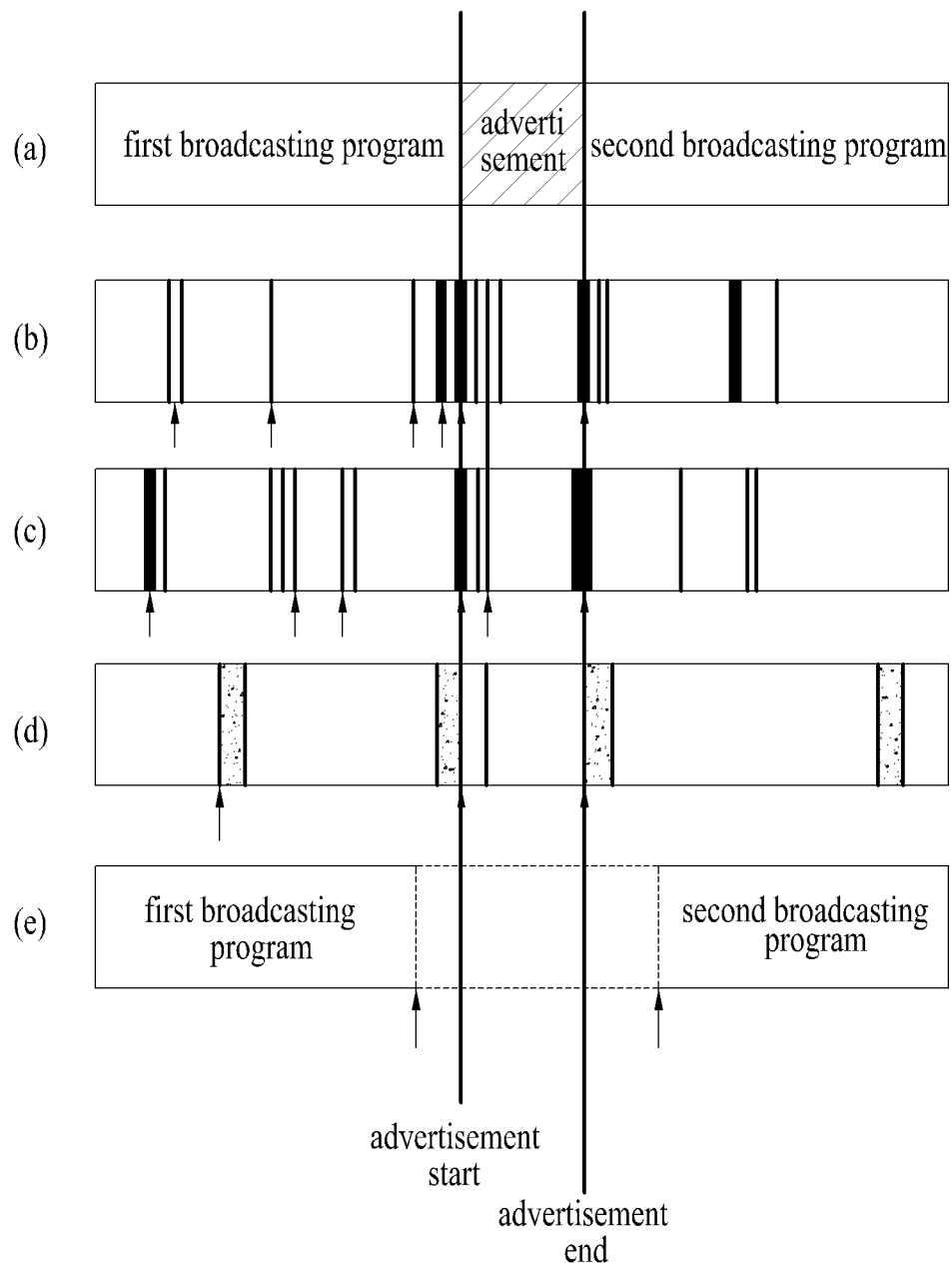
FIG. 5 is a diagram illustrating a procedure of detecting an advertising program of FIG. 4.

FIG. 4 is a block diagram illustrating an advertising program detector of FIG. 3, and FIG. 5 is a diagram illustrating a procedure of detecting an advertising program of FIG. 4.

As shown in FIG. 4, the advertising program detector 310 may include a black frame detector 312, a scene change detector 314, a silence detector 316, an EPG detector 318, and an advertisement start/end determination module 319.

The black frame detector 312 may detect information on a black frame from decoded video data and transmit the detected information to the advertisement start/end determination module 319.

The scene change detector 314 may detect information on a scene change from the video data decoded by the video decoder and transmit the detected information to the advertisement start/end determination module 319.

Also, the silence detector 316 may detect information on audio silence from decoded audio data and transmit the detected information to the advertisement start/end determination module.

Subsequently, the EPG detector 318 may detect EPG information from decoded EPG data and transmit the detected information to the advertisement start/end determination module 319.

Next, the advertisement start/end determination module 319 may determine advertisement start or end on the basis of the information detected from the back frame detector 312, the scene change detector 314, the silence detector 316 and the EPG detector 318, and transmit the determined result to the controller for advertising/broadcasting program switching.

In FIG. 5, each detection information is configured in the form of a bar to describe the procedure of detecting the advertising program, and actual broadcasting information (a), detected black frame information (b), detected scene change information (c), detected audio silence information (d), and EPG information (e) are shown.

(a) of FIG. 5 illustrates actual broadcasting, and it is noted from (a) of FIG. 5 that an advertising program exists between a first broadcasting program and a second broadcasting program.

However, in the present invention, a period for an advertising program may be set on the basis of the detected EPG information with reference to a switching time of the broadcasting program as shown in (e) of FIG. 5.

The advertisement start/end determination module 319 may determine whether a boundary value previously set from the detected black frame information (b), the detected scene change information (c), and the detected audio silence information (d) is located within the set advertising program period on the basis of the set advertising program period, thereby identifying a point where the advertising program starts and a point where the advertising program ends.

Subsequently, the result determined by the advertisement start/end determination module 319 is transferred to the controller, and the controller may perceive the advertising program period on the basis of the determined result and identify information on the perceived period, for example, information on advertisement type, advertisement start and end time, total advertising time.

Accordingly, the advertising program detector 310 may use detection information on the black frame and scene change from the video data within the broadcast signal including the broadcasting program when detecting the advertising program.

Also, the advertising program detector 310 may use detection information on the audio silence from the audio data within the broadcast signal including the broadcasting program when detecting the advertising program.

And, the advertising program detector 310 may detect the advertising program for an advertising detection period set on the basis of electronic program guide information among data for data broadcasting within the broadcast signal including the broadcasting program.

Subsequently, the advertising program detector 310 may use detection information on the black frame and scene change from the video data and detection information on the audio silence from the audio data, for the advertising detection period set on the basis of electronic program guide information, among the data for data broadcasting within the broadcast signal including the broadcasting program when detecting the advertising program.

Based on the above detection information, the controller may split the display screen into the first and second screens by controlling the screen splitter if the advertising program starts, display the advertising program of the current channel on the split second screen and at the same time display a predetermined content on the first screen by controlling the screen composition module, incorporate the split first and second screens into one screen by controlling the screen splitter if the advertising program ends from the current channel, and display the received advertising program of the current channel on one screen by controlling the screen composition module.

A method for displaying advertisement broadcasting of the multimedia device constituted as above will be described as follows.

Figure 6:
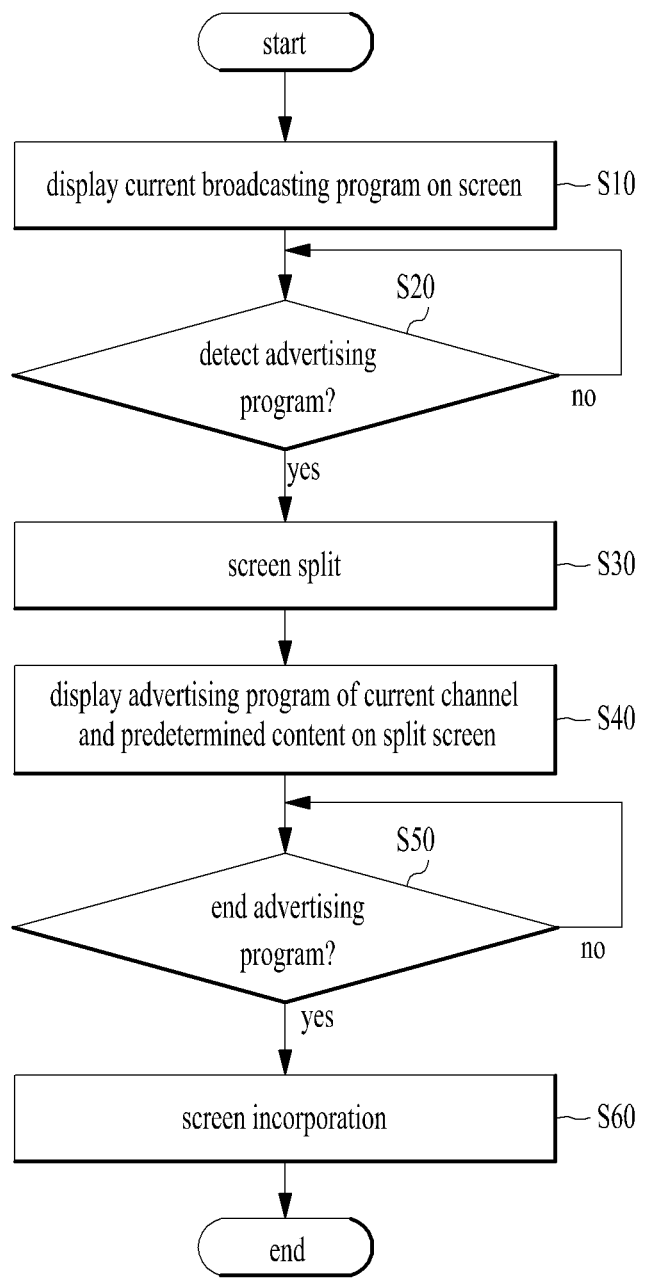
FIG. 6 is a flow chart illustrating a method for displaying advertisement broadcasting of a multimedia device according to the first embodiment of the present invention.

FIG. 6 is a flow chart illustrating a method for displaying advertisement broadcasting of a multimedia device according to the first embodiment of the present invention.

As shown in FIG. 6, first of all, the multimedia device may display the broadcasting program of the current channel, which is received, on the display screen (S10).

In this case, the display screen of the multimedia device may have a predetermined picture ratio. For example, a picture ratio of the display screen may be, but not limited to, 21:9 or 16:9.

If a broadcasting picture ratio of the broadcasting program is 16:9 when the picture ratio of the display screen is 21:9, the other area except the broadcasting screen area on the display screen may be displayed as a black area.

At this time, the black area may be located at either both sides of the broadcasting screen area or one side of the broadcasting screen area.

For example, when the picture ratio of the display screen is 21:9, the broadcasting screen area having a picture ratio of 16:9 may be located at the center of the display screen, and black areas each having a picture ratio of 2.5:9 may be arranged at both sides of the broadcasting screen area.

Also, when the picture ratio of the display screen is 21:9, the broadcasting screen area having a picture ratio of 16:9 and a black area having a picture ratio of 5:9 may be arranged on the display screen in parallel.

As the case may be, if the broadcasting picture ratio of the broadcasting program is equal to the picture ratio of the display screen, the display screen may be displayed as the broadcasting screen area without the black area.

For example, when the picture ratio of the display screen is 21:9, if the broadcasting picture ratio of the broadcasting program is 21:9, the display screen may be displayed as the broadcasting screen area without the black area.

Also, when the picture ratio of the display screen is 21:9, if the broadcasting picture ratio of the broadcasting program is 16:9, the display screen may be displayed as the broadcasting screen area without the black area.

Subsequently, the advertising/broadcasting program switching module of the multimedia device may identify whether the advertising program is detected from the current channel (S20).

In this case, the advertising program may be detected using detection information on black frame and scene change from the video data within the broadcast signal including the broadcasting program.

As the case may be, the advertising program may be detected using detection information on audio silence from the audio data within the broadcast signal including the broadcasting program.

As another case, the advertising program may be detected for the advertisement detection period set based on the electronic program guide information of data for data broadcasting within the broadcast signal including the broadcasting program.

As still another case, the advertising program may be detected using detection information on black frame and scene change from the video data and detection information on audio silence from the audio data for the advertisement detection period set based on the electronic program guide information of data for data broadcasting within the broadcast signal including the broadcasting program.

Next, the advertising/broadcasting program switching module of the multimedia device may split the display screen into the first screen and the second screen if the advertising program is detected from the current channel (S30).

In this case, the area of the first screen and the area of the second screen may be different from each other.

At this time, the area of the first screen may be, but not limited to, greater than that of the second screen.

For example, if a picture ratio of the entire screen is 21:9, the picture ratio of the first screen may be 16:9, and the picture ratio of the second screen may be 5:9.

Also, the advertising/broadcasting program switching module of the multimedia device may arrange the first screen and the second screen in parallel when splitting the display screen into the first screen and the second screen.

As another case, the advertising/broadcasting program switching module of the multimedia device may arrange the second screens at both sides of the first screen on the basis of the first screen when splitting the display screen into the first screen and the second screen.

In this case, the areas of the second screens arranged at both sides of the first screen may be the same as each other.

Also, the advertising/broadcasting program switching module of the multimedia device may re-split the second screen into a plurality of sub screens when splitting the display screen into the first screen and the second screen.

In this way, the advertising/broadcasting program switching module of the multimedia device may split the display screen in accordance with split information which is previously set.

As the case may be, the advertising/broadcasting program switching module of the multimedia device may provide the user with information on screen split by configuring a user interface for screen split through the user interface manager if the advertising program is detected, and may split the screen in accordance with screen split information selected by the user.

Next, the advertising/broadcasting program switching module of the multimedia device may display the advertising program of the current channel on the split second screen and at the same time display a predetermined content on the first screen (S40).

In this case, the advertising/broadcasting program switching module of the multimedia device may display programs corresponding to the split screens in accordance with screen composition information which is previously set.

As the case may be, the advertising/broadcasting program switching module of the multimedia device may provide the user with information on screen composition by configuring a user interface for screen composition through the user interface manager, and may compose the screen in accordance with screen composition information selected by the user.

For example, the advertising/broadcasting program switching module of the multimedia device may compose the split screens to display the advertising program of the current channel on the split second screen and at the same time display the predetermined content on the first screen.

As the case may be, program guide information such as EPG (Electronic Program Guide) and a list of recording programs may be displayed on the split second screen.

In this case, the program guide information provided on the second screen may be any one of contents desired to be displayed on the first screen.

Accordingly, if the user selects any one of the program guide information provided on the second screen, the program corresponding to the selected program guide information may be displayed on the first screen.

As another case, detailed information on the advertising program of the current channel may be displayed on the split second screen.

As still another case, the split second screen may remain as a blank area without display of content thereon.

Also, if the split second screen includes first and second sub screens, the screen composition module may compose the split screens to display the advertising program of the current channel on the first sub screen and display a predetermined advertisement related content on the second sub screen.

As the case may be, the advertising/broadcasting program switching module of the multimedia device may display a content related to the advertising program displayed on the first sub screen, on the second sub screen.

For example, detailed information on the advertising program displayed on the first sub screen may be displayed on the second screen.

As another case, the advertising/broadcasting program switching module of the multimedia device may display another advertising program other than the advertising program displayed on the first sub screen, on the second sub screen.

As still another case, program guide information such as EPG (Electronic Program Guide) and a list of recording programs may be displayed on the second sub screen.

In this case, the program guide information provided on the second sub screen may be any one of contents desired to be displayed on the first screen.

Accordingly, if the user selects any one of the program guide information provided on the second sub screen, the program corresponding to the selected program guide information may be displayed on the first screen.

The advertising/broadcasting program switching module of the multimedia device may display at least one of a broadcasting program of another channel, a download application, external video, recorded video, web site, and SNS on the first screen when displaying a predetermined content on the first screen.

As the case may be, the advertising/broadcasting program switching module of the multimedia device may display a content of a channel having the same attribute as that of the channel of the broadcasting program prior to screen split on the first screen when displaying a predetermined content on the first screen.

As another case, the advertising/broadcasting program switching module of the multimedia device may display a content having the same genre as that of the broadcasting program prior to screen split on the first screen when displaying a predetermined content on the first screen.

As still another case, the advertising/broadcasting program switching module of the multimedia device may display a content having the highest ratings on the first screen by detecting xml type real time ratings data when displaying a predetermined content on the first screen.

As further still another case, the advertising/broadcasting program switching module of the multimedia device may display a content having a search keyword of the highest priority on the first screen by detecting xml type real time popular search keyword when displaying a predetermined content on the first screen.

As further still another case, the advertising/broadcasting program switching module of the multimedia device may display the program selected from the program guide information provided on the second screen when displaying a predetermined content on the first screen.

Next, the advertising/broadcasting program switching module of the multimedia device may identify whether the advertising program ends from the current channel (S50).

In this case, the advertising program may be ended using detection information on black frame and scene change from the video data within the broadcast signal including the broadcasting program.

As the case may be, the advertising program may be ended using detection information on audio silence from the audio data within the broadcast signal including the broadcasting program.

As another case, the advertising program may be ended for the advertisement detection period set based on the electronic program guide information of data for data broadcasting within the broadcast signal including the broadcasting program.

As still another case, the advertising program may be ended using detection information on black frame and scene change from the video data and detection information on audio silence from the audio data for the advertisement detection period set based on the electronic program guide information of data for data broadcasting within the broadcast signal including the broadcasting program.

The advertising/broadcasting program switching module of the multimedia device may incorporate the split first and second screens into one screen if the advertising program ends from the current channel (S60).

Figure 7:
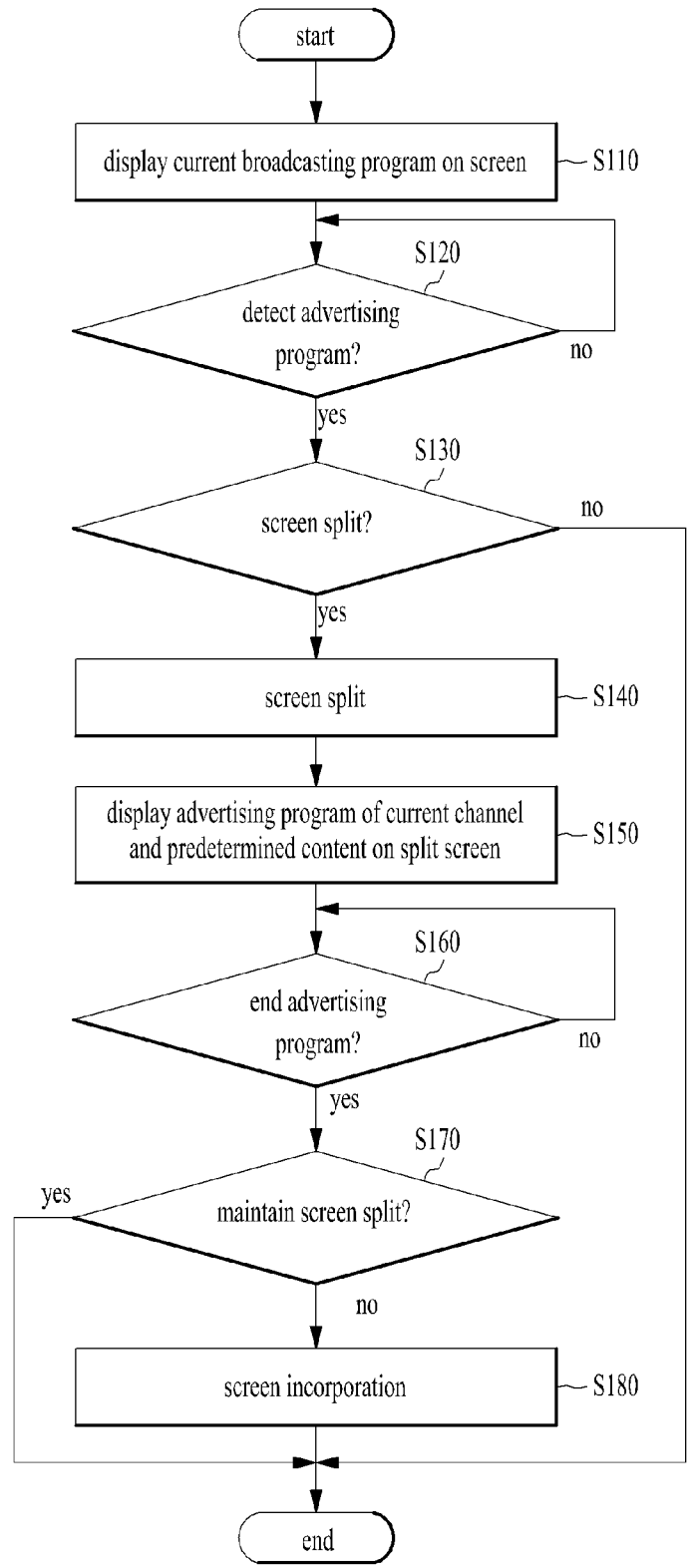
FIG. 7 is a flow chart illustrating a method for displaying advertisement broadcasting of a multimedia device according to the second embodiment of the present invention.

FIG. 7 is a flow chart illustrating a method for displaying advertisement broadcasting of a multimedia device according to the second embodiment of the present invention.

As shown in FIG. 7, first of all, the multimedia device may display the broadcasting program of the current channel, which is received, on the display screen (S110).

Subsequently, the advertising/broadcasting program switching module of the multimedia device may identify whether the advertising program is detected from the current channel (S120).

Next, if the advertising program is detected from the current channel, the advertising/broadcasting program switching module of the multimedia device provides the user with information on screen split by configuring a user interface for screen split through the a user interface manager and identifies from the user whether screen split is performed (S130).

Figure 8:
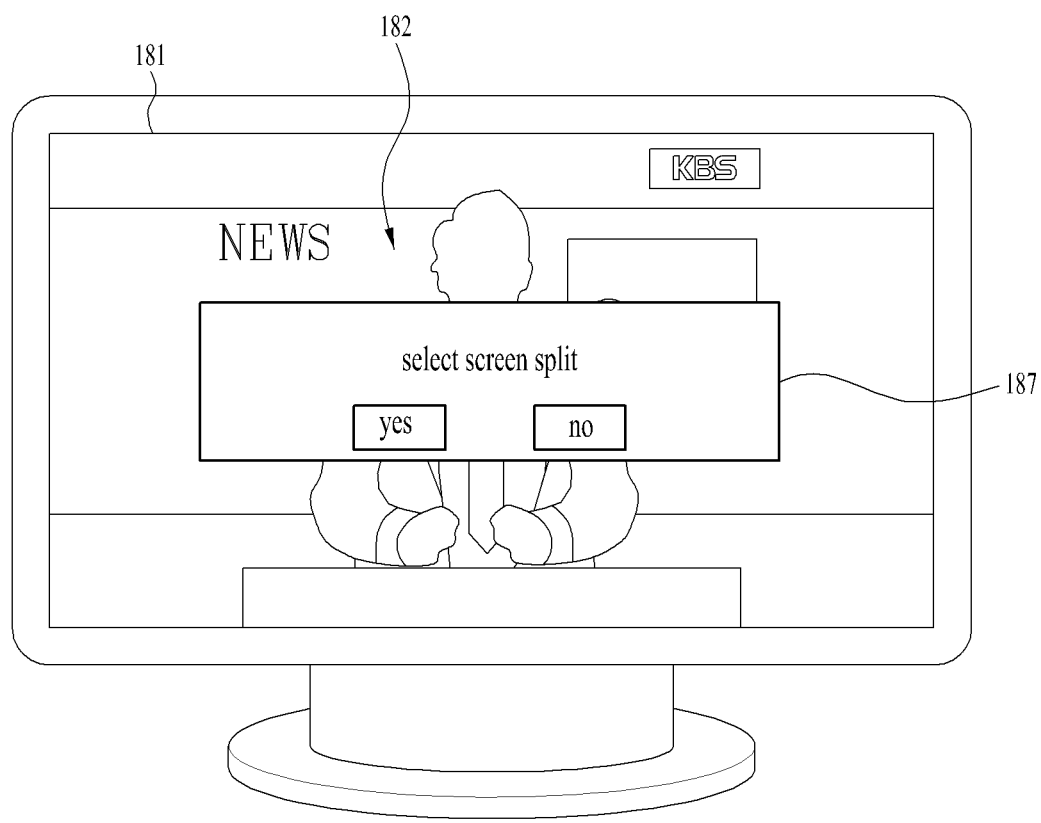
FIGS. 8 to 11 are diagrams illustrating a user interface provided from a user interface manager.

In this case, as shown in FIG. 8, the advertising/broadcasting program switching module of the multimedia device may generate a message window 187 as to whether screen split is performed and provide the user with the generated message window 187.

A screen split pattern may previously be determined, and a split pattern list window, which includes a plurality of screen split pattern items, may be provided.

Figure 9:
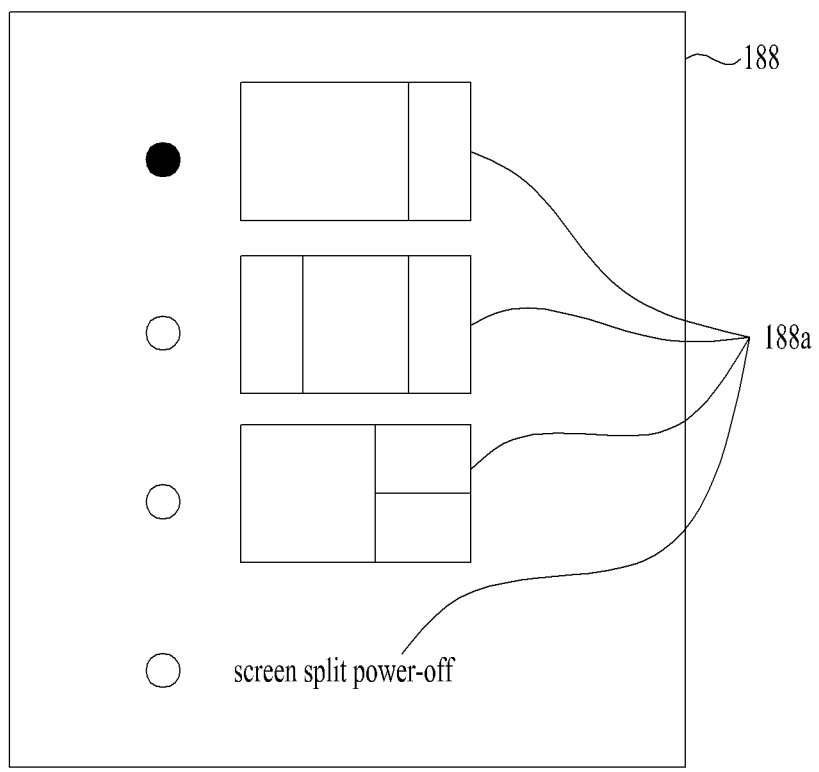

As the case may be, the advertising/broadcasting program switching module of the multimedia device may provide a screen split pattern list window (188), which includes a plurality of screen split pattern items 188a, as shown in FIG. 9 without generating the message window 187 as to whether screen split is performed.

At this time, the plurality of screen split pattern items 188a may include a screen split power-off item that does not perform screen split.

Accordingly, the user may select whether to perform screen split and at the same time select the screen split pattern.

Subsequently, the advertising/broadcasting program switching module of the multimedia device may split the display screen into the first screen and the second screen if there is a request of screen split from the user (S140).

In this case, the advertising/broadcasting program switching module of the multimedia device may split the display screen in accordance with the screen split pattern which is previously set.

As the case may be, the advertising/broadcasting program switching module of the multimedia device may split the screen in accordance with the screen split pattern selected by the user as shown in FIG. 9.

Also, the advertising/broadcasting program switching module of the multimedia device may provide the user with information on screen composition by configuring a user interface for screen composition through the user interface manager, and may compose the screen in accordance with screen composition information selected by the user.

Figure 10:
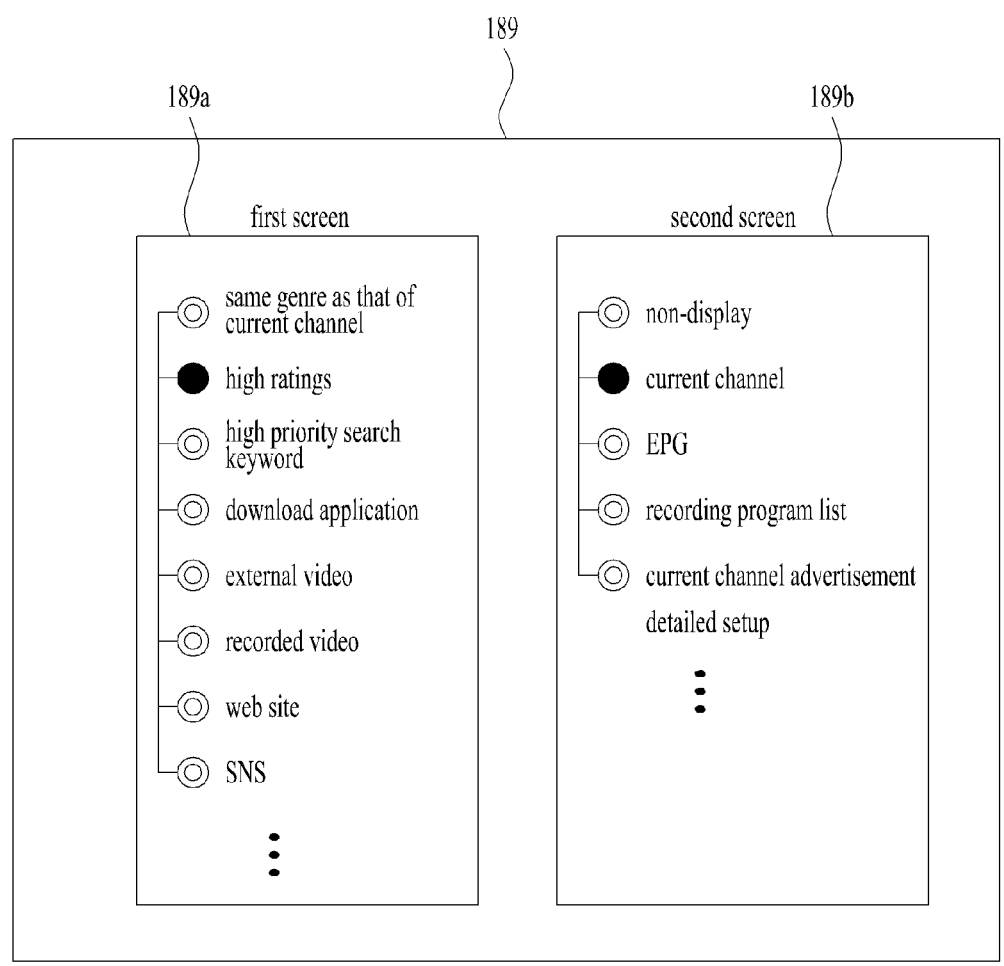

In this case, the advertising/broadcasting program switching module of the multimedia device may provide a content list window 189, which includes content items to be displayed on the split screen, as shown in FIG. 10 if the user selects screen split or the screen split pattern.

For example, as shown in FIG. 10, the content list window 189 may include a first content list 189a that includes content items to be displayed on the first screen, and a second content list 189b that includes content items to be displayed on the second screen.

In this case, the first content list 189a to be displayed on the first screen may include, but not limited to, a content item of a channel having the same attribute as that of the channel of the broadcasting program prior to screen split, a content item having the same genre as that of the broadcasting program prior to screen split, a content item having a search keyword of the highest priority by detecting xml type real time popular search keyword data, a program related content item corresponding to the program guide information selected from the program guide information provided on the second screen, a broadcasting program related content item of another channel, a download application related content item, an external video related content item, a recording video related content item, a web site related content item, and an SNS related content item.

The second content list 189b to be displayed on the second screen may include, but not limited to, a non-display content item, an advertising program related content item of the current channel, an EPG related content item, a recording program related content item, and a detailed information related content item of the advertising program of the current channel.

Subsequently, the advertising/broadcasting program switching module of the multimedia device may display the advertising program of the current channel on the split second screen and at the same time display a predetermined content on the first screen (S150).

In this case, the advertising/broadcasting program switching module of the multimedia device may display contents corresponding to the split screens in accordance with the content item which is previously set.

As the case may be, the advertising/broadcasting program switching module of the multimedia device may display contents corresponding to the split screens in accordance with the content item selected by the user as shown in FIG. 10.

Next, the advertising/broadcasting program switching module of the multimedia device may identify whether the advertising program ends from the current channel (S160).

Figure 11:
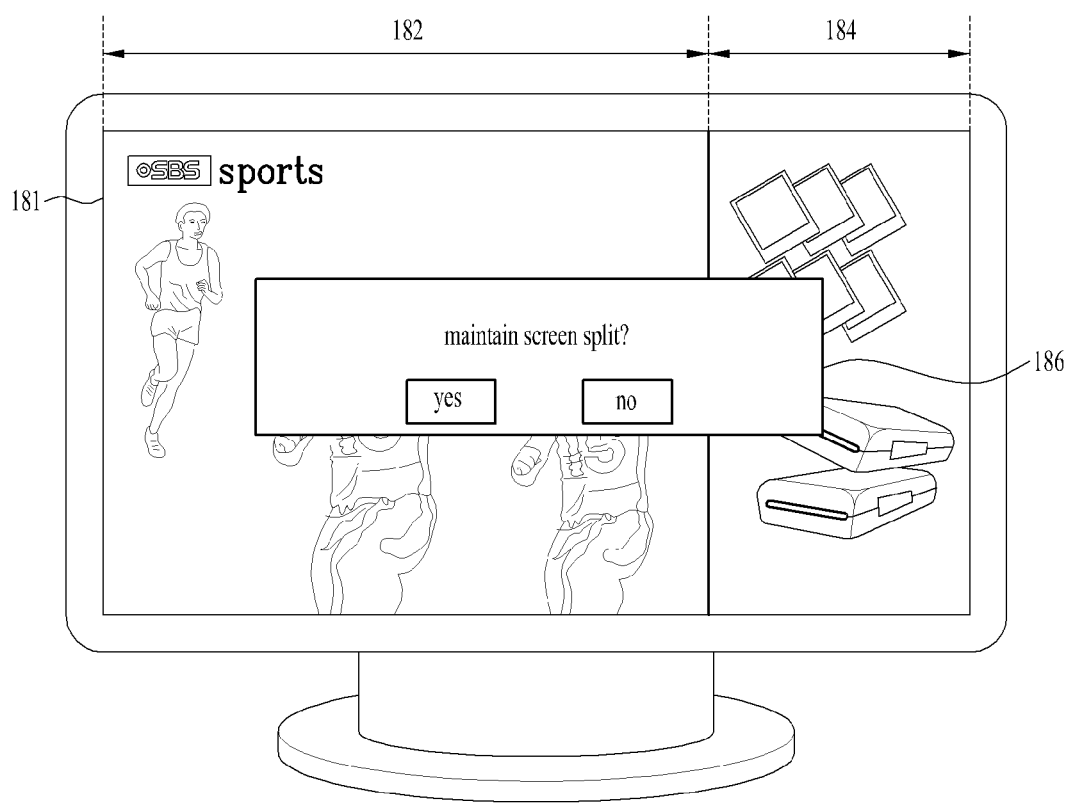

If the advertising program ends from the current channel, the advertising/broadcasting program switching module of the multimedia device generates a message window 186 as to whether screen split is maintained, as shown in FIG. 11, and provides the user with the generated message window 186 and identifies from the user whether screen split is maintained (S170).

Subsequently, the advertising/broadcasting program switching module of the multimedia device may incorporate the split first and second screens into one screen if there is a request of non-maintenance of screen split from the user, and continues to maintain screen split if there is a request of maintenance of screen split from the user (S180).

FIGS. 8 to 11 are diagrams illustrating a user interface provided from a user interface manager.

FIG. 8 illustrates a message window as to whether screen split is performed. Referring to FIG. 8, if the advertising program is detected from the current channel, the user interface manager may provide a message window 187 as to whether screen split is performed, on a broadcasting screen area 182 of a display screen 181 by configuring a user interface as to whether screen split is performed.

FIG. 9 illustrates a split pattern list window. Referring to FIG. 9, if there is a request of setup change of a screen split pattern from the user, or if the advertising program is detected from the current channel, the user interface manager may automatically provide a split pattern list window 188 that includes a plurality of screen split pattern items 188a.

At this time, the plurality of screen split pattern items 188a may include a screen split power-off item that does not perform screen split.

Accordingly, the user may select whether to perform screen split and at the same time select the screen split pattern.

Subsequently, FIG. 10 illustrates a content list window. Referring to FIG. 10, if there is a request of setup change of a split screen content from the user, or if the user selects screen split from a split related user interface, the user interface manager may provide a content list window 189 that includes content items to be displayed on the split screen.

In this case, the content list window 189 may include a first content list 189a that includes content items to be displayed on the first screen, and a second content list 189b that includes content items to be displayed on the second screen.

For example, the first content list 189a to be displayed on the first screen may include, but not limited to, a content item of a channel having the same attribute as that of the channel of the broadcasting program prior to screen split, a content item having the same genre as that of the broadcasting program prior to screen split, a content item having a search keyword of the highest priority by detecting xml type real time popular search keyword data, a program related content item corresponding to the program guide information selected from the program guide information provided on the second screen, a broadcasting program related content item of another channel, a download application related content item, an external video related content item, a recording video related content item, a web site related content item, and an SNS related content item.

The second content list 189b to be displayed on the second screen may include, but not limited to, a non-display content item, an advertising program related content item of the current channel, an EPG related content item, a recording program related content item, and a detailed information related content item of the advertising program of the current channel.

Subsequently, FIG. 11 illustrates a message window as to whether screen split is maintained. Referring to FIG. 11, if the advertising program ends from the current channel, the user interface manager may provide a message window 186 as to whether screen split is maintained, on the display screen 181.

Figure 12A:
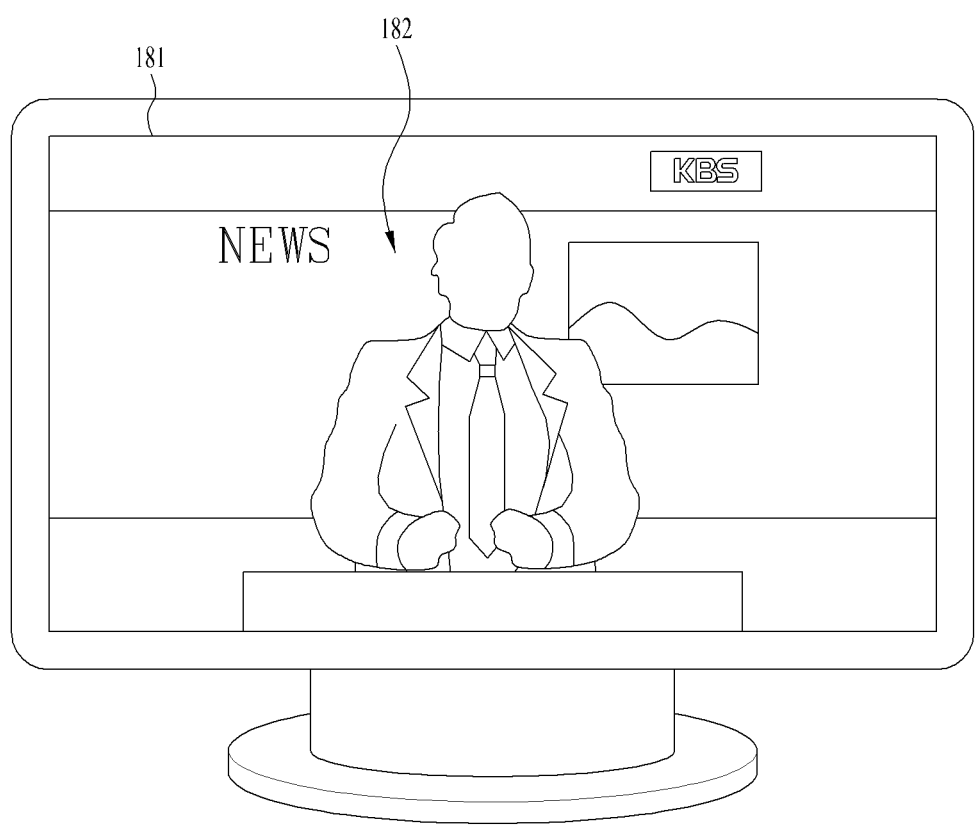
FIGS. 12A to 12C are diagrams illustrating a broadcasting screen based on a picture ratio of a display screen.
Figure 12B:
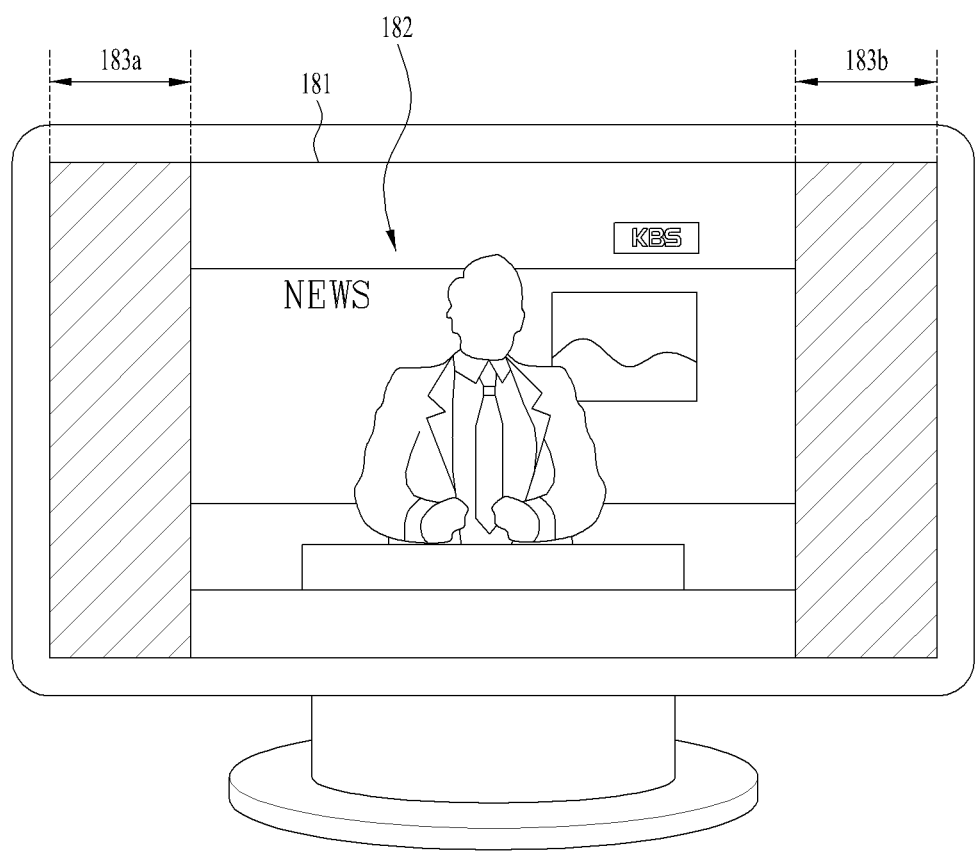
Figure 12C:
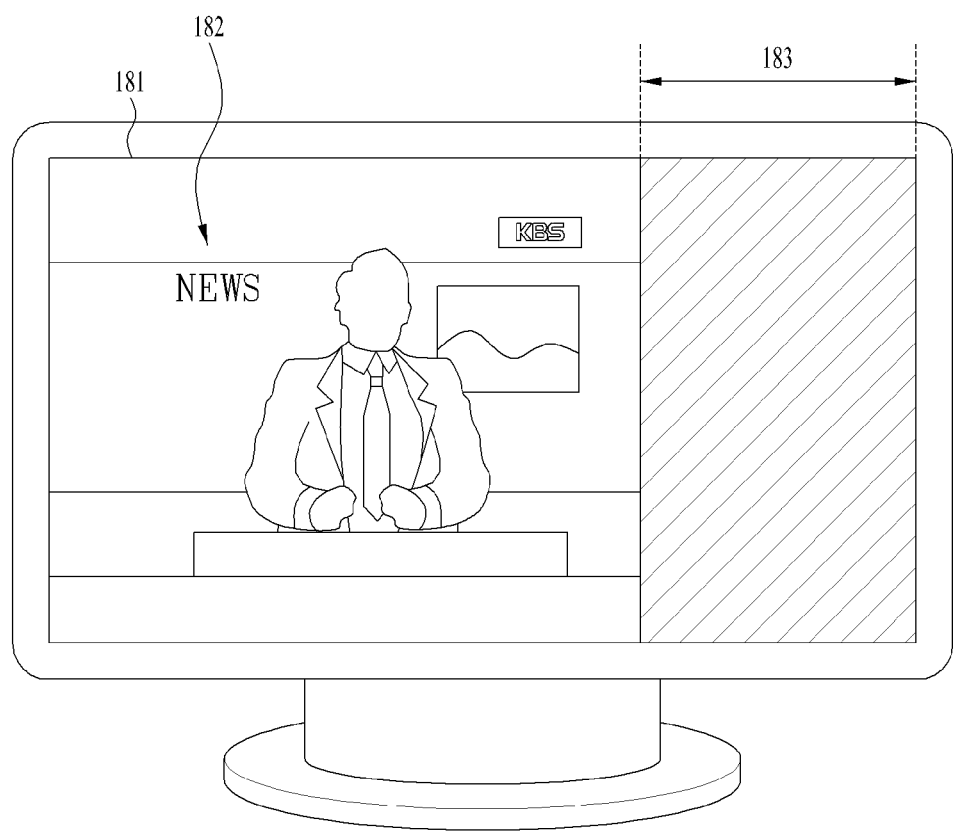

FIGS. 12A to 12C are diagrams illustrating a broadcasting screen based on a picture ratio of a display screen.

As shown in FIGS. 12A to 12C, the multimedia device may display the broadcasting program of the current channel, which is received, on the display screen 181.

In this case, the display screen 181 of the multimedia device may have a predetermined picture ratio. For example, a picture ratio of the display screen may be, but not limited to, 21:9 or 16:9.

As the case may be, as shown in FIG. 12A, if the broadcasting picture ratio of the broadcasting program is equal to the picture ratio of the display screen, the display screen 181 may be displayed as the broadcasting screen area 182 without the black area.

For example, when the picture ratio of the display screen is 21:9, if the broadcasting picture ratio of the broadcasting program is 21:9, the display screen 181 may be displayed as the broadcasting screen area without the black area.

Also, when the picture ratio of the display screen is 16:9, if the broadcasting picture ratio of the broadcasting program is 16:9, the display screen 181 may be displayed as the broadcasting screen area without the black area.

When the picture ratio of the display screen is 21:9, if the broadcasting picture ratio of the broadcasting program is 16:9, some area of the display screen 181 except the broadcasting screen area may be displayed as the black area 183.

At this time, the black area 183 may be located at either both sides of the broadcasting screen area 182 or one side of the broadcasting screen area 182.

For example, as shown in FIG. 12B, when the picture ratio of the display screen is 21:9, the broadcasting screen area having a picture ratio of 16:9 may be located at the center of the display screen 181, and black areas 183a and 183b each having a picture ratio of 2.5:9 may be arranged at both sides of the broadcasting screen area 182.

Also, as shown in FIG. 12C, when the picture ratio of the display screen is 21:9, the broadcasting screen area 182 having a picture ratio of 16:9 and the black area 183 having a picture ratio of 5:9 may be arranged on the display screen 181 in parallel.

Figure 13:
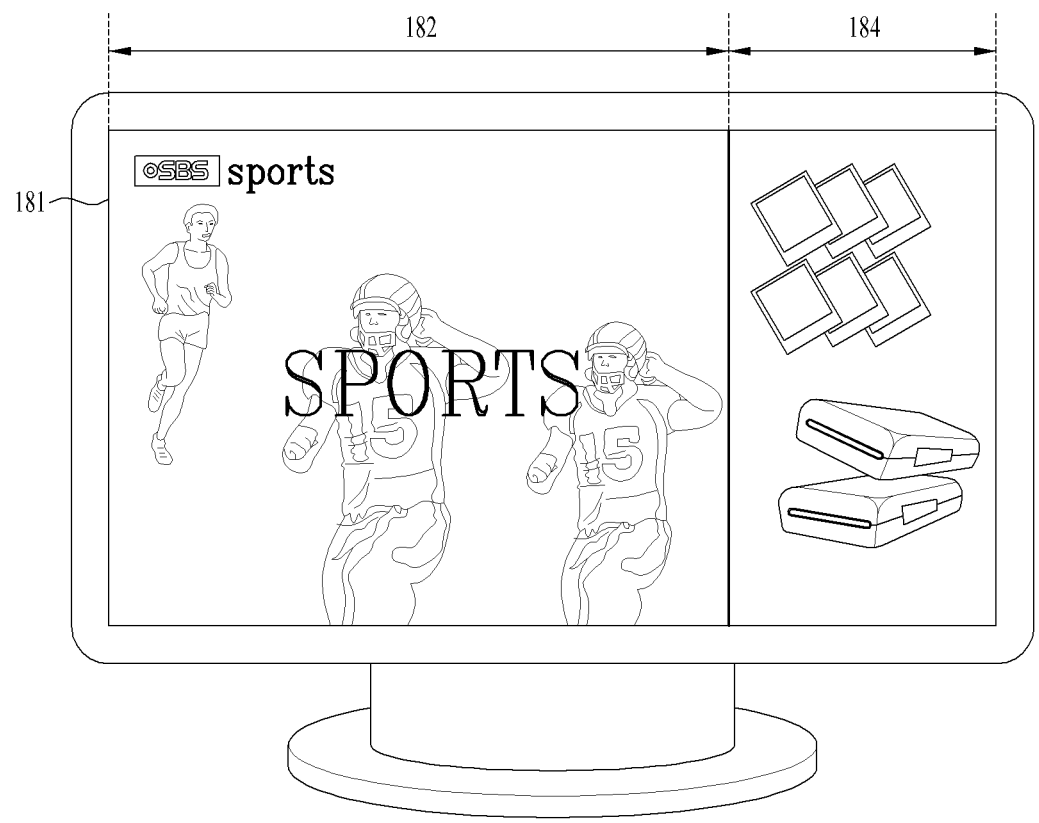
FIGS. 13 and 14 are diagrams illustrating advertising and broadcasting programs displayed on split screens.
Figure 14:
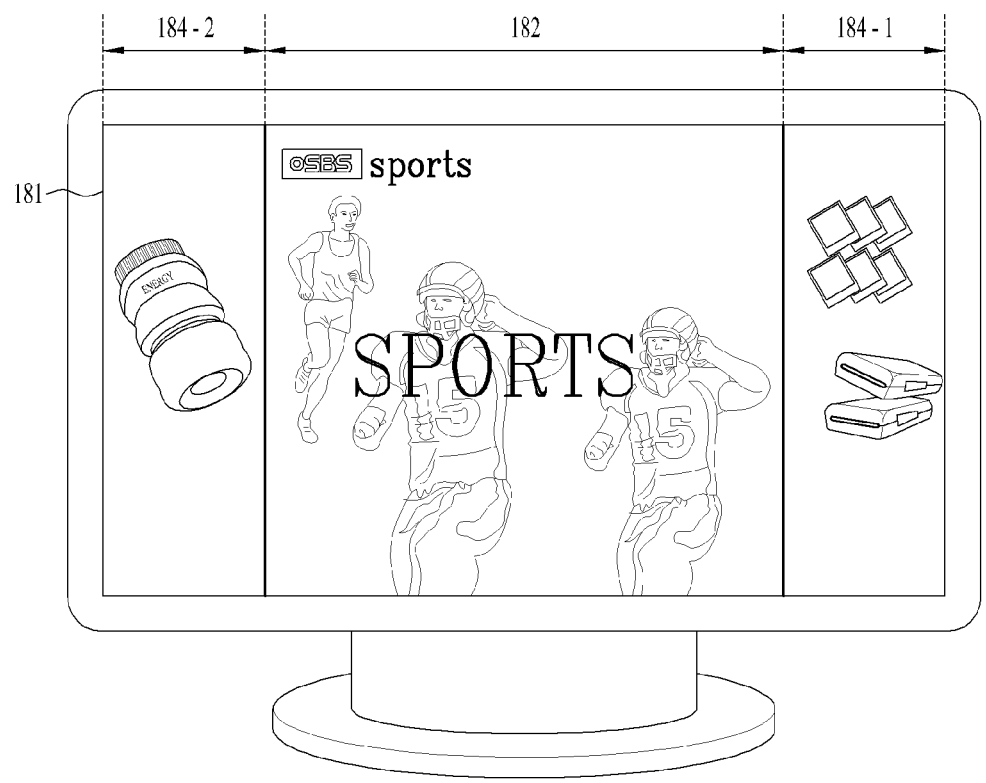

FIGS. 13 and 14 are diagrams illustrating advertising and broadcasting programs displayed on split screens.

As shown in FIGS. 13 and 14, if the advertising program is detected from the current channel, the advertising/broadcasting program switching module of the multimedia device may split the display screen 181 into the broadcasting screen area 182 which is the first screen and the advertising screen area 184 which is the second screen.

In this case, an area of the broadcasting screen area 182 and an area of the advertising screen area 184 may be different from each other.

At this time, the area of the broadcasting screen area 182 may be, but not limited to, greater than that of the advertising screen area 184.

For example, if a picture ratio of the entire screen is 21:9, the picture ratio of the broadcasting screen area 182 may be 16:9, and the picture ratio of the advertising screen area 184 may be 5:9.

Also, as shown in FIG. 13, the advertising/broadcasting program switching module of the multimedia device may arrange the broadcasting screen area 182 and the advertising screen area 184 in parallel when splitting the display screen 181 into the broadcasting screen area 182 and the advertising screen area 184.

As another case, as shown in FIG. 14, the advertising/broadcasting program switching module of the multimedia device may arrange the broadcasting screen areas 184-1 and 184-2 at both sides of the broadcasting screen area 182 on the basis of the broadcasting screen area 182 when splitting the display screen 181 into the broadcasting screen area 182 and the advertising screen area 184.

In this case, the areas of the advertising screen areas 184-1 and 184-2 arranged at both sides of the broadcasting screen area 182 may be the same as each other.

At this time, the advertising screen area 184-1 arranged at one side of the broadcasting screen area 182 may be the advertising program of the current channel, and the advertising screen area 184-2 arranged at the other side of the broadcasting screen area 182 may be the advertising program of another channel.

As the case may be, the advertising screen area 184-2 arranged at the other side of the broadcasting screen area 182 may display a content related to the advertising program of the current channel.

As another case, the advertising screen area 184-2 arranged at the other side of the broadcasting screen area 182 may display a content having the same attribute as that of the channel of the broadcasting program displayed on the broadcasting screen area 182, after screen split.

For example, after screen split, if the channel of the broadcasting program displayed on the broadcasting screen area 182 is a channel number 7, the advertising screen area 184-2 arranged at the other side of the broadcasting screen area 182 may display a content the same as that of the advertising program of the channel number 7.

As still another case, the advertising screen area 184-2 arranged at the other side of the broadcasting screen area 182 may display a content having the same genre as that of the broadcasting program displayed on the broadcasting screen area 182, after screen split.

For example, after screen split, if the genre of the broadcasting program displayed on the broadcasting screen area 182 is sports, the advertising screen area 184-2 arranged at the other side of the broadcasting screen area 182 may display a sports related content.

Also, a predetermined content such as a broadcasting program of a channel preferred by a viewer may be displayed on the broadcasting screen area 182. For example, at least one of a broadcasting program of another channel, a download application, external video, recorded video, web site, and SNS may be displayed on the broadcasting screen area 182.

As the case may be, a content of a channel having the same attribute as that of the channel of the broadcasting program prior to screen split may be displayed on the broadcasting screen area 182.

As another case, a content having the same genre as that of the broadcasting program prior to screen split may be displayed on the broadcasting screen area 182.

As still another case, a content having the highest ratings may be displayed on the broadcasting screen area 182 by detection of xml type real time ratings.

As further still another case, a content having a search keyword of the highest priority may be displayed on the broadcasting screen area 182 by detection of xml type real time popular search keyword.

As further still another case, if the program guide information is provided on the advertising screen area 184, the program selected from the program guide information may be displayed on the broadcasting screen area 182.

Also, the advertising program of the current channel may be displayed on the advertising screen area 184.

As the case may be, program guide information such as EPG (Electronic Program Guide) and a list of recording programs may be displayed on the advertising screen area 184.

In this case, the program guide information provided on the advertising screen area 184 may be any one of contents desired to be displayed on the broadcasting screen area 182.

Accordingly, if the user selects any one of the program guide information provided on the advertising screen area 184, the program corresponding to the selected program guide information may be displayed on the broadcasting screen area 182.

As another case, detailed information on the advertising program of the current channel may be displayed on the advertising screen area 184.

As still another case, the advertising screen area 184 may remain as a blank area without display of content thereon.

Figure 15A:
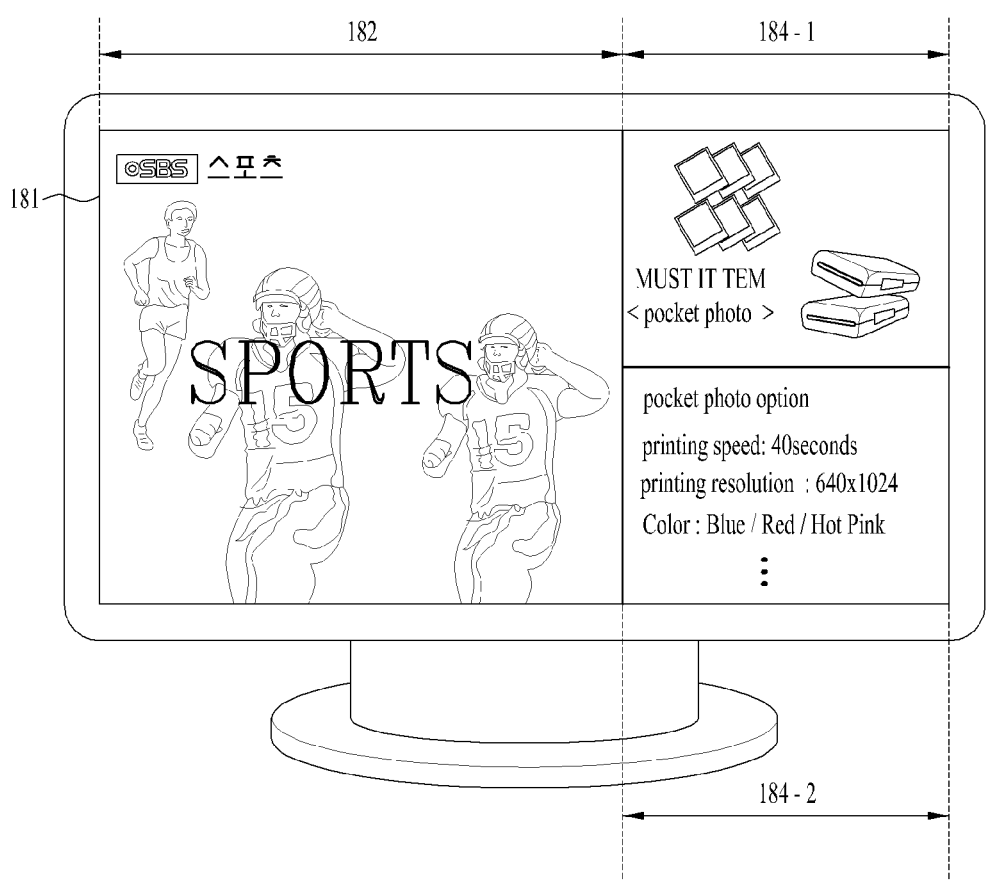
FIGS. 15A to 15C are diagrams illustrating advertising programs displayed on a plurality of sub screens.
Figure 15B:
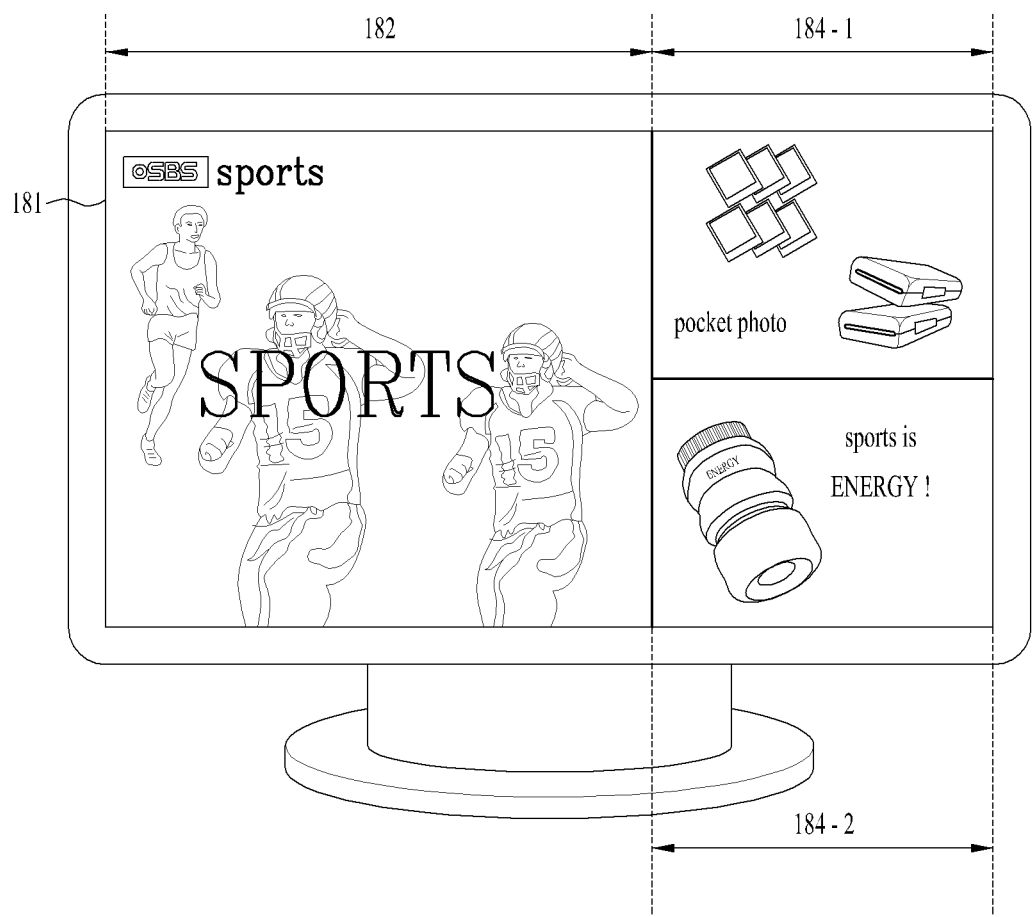
Figure 15C:
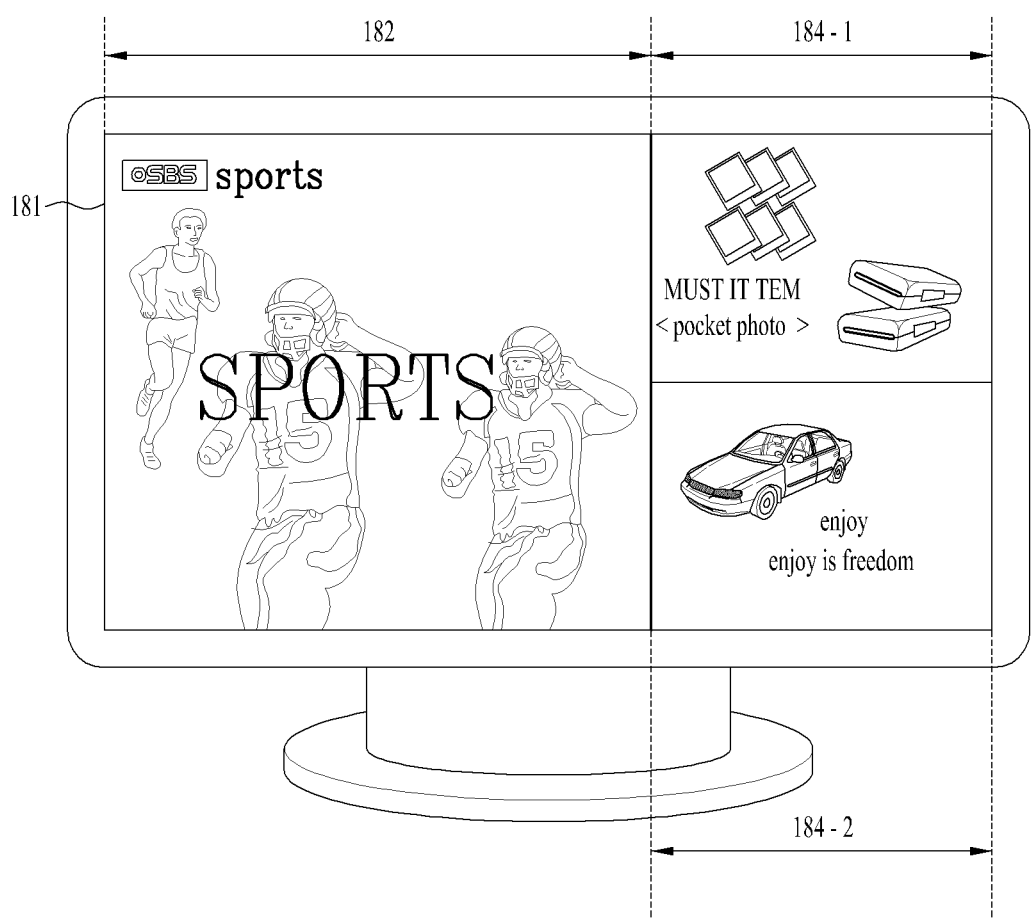

FIGS. 15A to 15C are diagrams illustrating advertising programs displayed on a plurality of sub screens.

As shown in FIGS. 15A to 15C, the advertising/broadcasting program switching module of the multimedia device may re-split the advertising screen area 184 into a plurality of sub screens 184-1 and 184-2 when splitting the display screen 181 into the broadcasting screen area 182 which is the first screen and the advertising screen area 184 which is the second screen.

In this case, the split screens may be configured such that the advertising program of the current channel may be displayed on the first sub screen 184-1 and predetermined advertisement related content may be displayed on the second sub screen 184-2.

As shown in FIG. 15A, the content related to the advertising program displayed on the first sub screen 184-1 may be displayed on the second sub screen 184-2.

For example, additional information on the advertising program displayed on the first sub screen 184-1, for example, banner or home page may be displayed on the second sub screen 184-2.

In other words, detailed information on the advertising program displayed on the first sub screen 184-1 may be displayed on the second sub screen 184-2.

As another case, as shown in FIGS. 15B and 15C, another advertising program other than the advertising program displayed on the first sub screen 184-1 may be displayed on the second sub screen 184-2.

In this case, another advertising program displayed on the second sub screen 184-2 may be the program transmitted at the same time zone as that of the advertising program displayed on the first sub screen 184-1.

Also, another advertising program displayed on the second sub screen 184-2 may be the advertising program of the channel having the same attribute as that of the broadcasting program displayed on the broadcasting screen area 182 after screen split.

For example, after screen split, if the channel of the broadcasting program displayed on the broadcasting screen area 182 is a channel number 7, another advertising program displayed on the second sub screen 184-2 may be the advertising program of the channel number 7.

As another case, another advertising program displayed on the second sub screen 184-2 may display a content having the same genre as that of the broadcasting program displayed on the broadcasting screen area 182, after screen split.

For example, after screen split, if the genre of the broadcasting program displayed on the broadcasting screen area 182 is sports, another advertising program displayed on the second sub screen 184-2 may be a sports related advertising program.

As the case may be, another advertising program displayed on the second sub screen 184-2 may display at least one of a broadcasting program of another channel corresponding to the same time zone, a download application, external video, recorded video, web site, and SNS.

As still another case, program guide information such as EPG (Electronic Program Guide) and a list of recording programs may be displayed on the second sub screen 184-2.

In this case, the program guide information provided on the second sub screen 184-2 may be any one of contents desired to be displayed on the first screen 182.

Accordingly, if the user selects any one of the program guide information provided on the second sub screen 184-2, the program corresponding to the selected program guide information may be displayed on the first screen 182.

Figure 16:
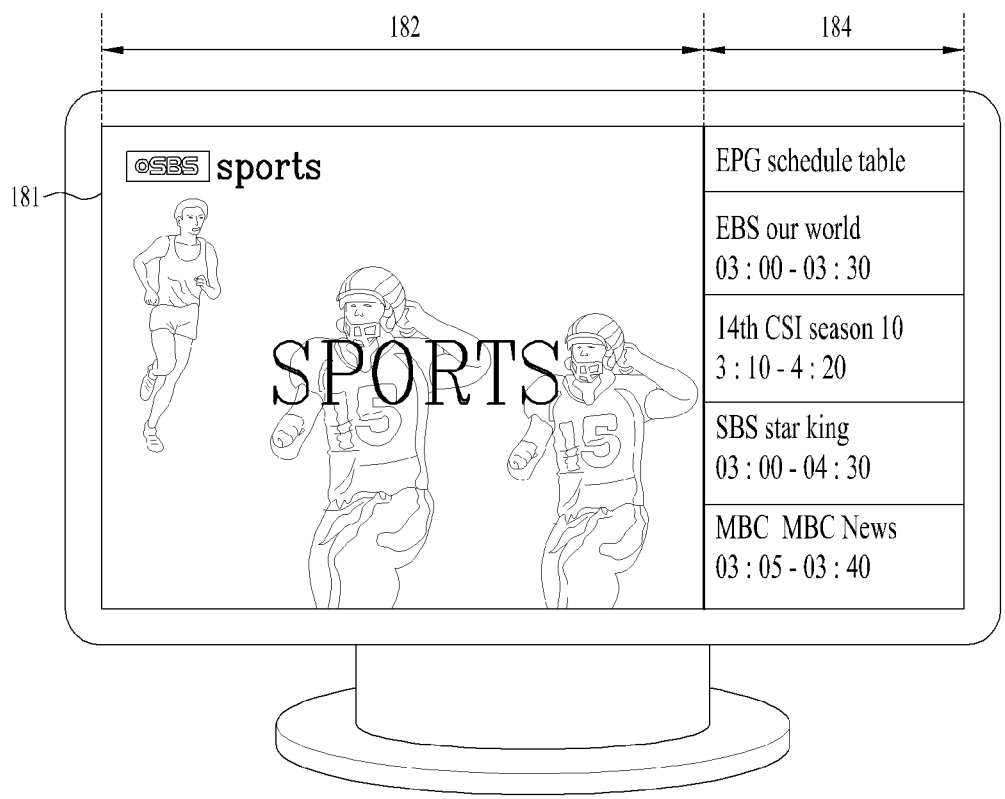
FIG. 16 is a diagram illustrating program guide information displayed on an advertising screen area.

FIG. 16 is a diagram illustrating program guide information displayed on an advertising screen area.

As shown in FIG. 16, program guide information such as EPG (Electronic Program Guide) and a list of recording programs may be displayed on the advertising screen area 184.

In this case, the program guide information provided on the advertising screen area 184 may be any one of contents desired to be displayed on the broadcasting screen area 182.

Accordingly, if the user selects any one of the program guide information provided on the advertising screen area 184, the program corresponding to the selected program guide information may be displayed on the broadcasting screen area 182.

As described above, according to the present invention, if the advertising program starts from the current viewing channel, the display screen may be split to display the advertising program of the current channel on some screen area and at the same time display predetermined content on the other area, whereby various contents may be provided even in the middle of advertisement, and thus fun and convenience may be provided to the viewer.

In addition, according to the present invention, since various advertisements and advertisement related information may be provided additionally without skip of advertisement, a new business model may be provided to the advertiser and the broadcasting station.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying advertisement broadcasting of a multimedia device, which includes a display screen of a predetermined picture ratio, the method comprising:
    displaying a broadcasting program of a current channel on the display screen;
    splitting the display screen into a first screen and a second screen if an advertising program is detected from the current channel;
    displaying the advertising program of the current channel on the second screen and at the same time displaying a predetermined content on the first screen;
    incorporating the first and second screens into one screen if the advertising program ends from the current channel; and
    displaying the broadcasting program of the current channel on the one screen,
    wherein when the advertising program is detected from the current channel, a first message window as to whether to perform a screen split is displayed on the display screen, and wherein when the advertising program ends from the current channel, a second message window as to whether to maintain the screen split is displayed on the display screen.

2. The method according to claim 1, wherein an area of the first screen and an area of the second screen are different from each other in the splitting of the display screen into the first screen and the second screen.

3. The method according to claim 2, wherein the area of the first screen is greater than the area of the second screen.

4. The method according to claim 1, wherein the splitting of the display screen into the first screen and the second screen includes arranging the first screen and the second screen in parallel.

5. The method according to claim 1, wherein the splitting of the display screen into the first screen and the second screen includes arranging the second screen at both sides of the first screen.

6. The method according to claim 5, wherein areas of the second screens arranged at both sides of the first screen are the same as each other.

7. The method according to claim 1, wherein the splitting of the display screen into the first screen and the second screen includes splitting the second screen into a plurality of sub screens.

8. The method according to claim 7, wherein the plurality of sub screens include a first sub screen to display the advertising program of the current channel and at least one second sub screen to display a predetermined advertisement related content.

9. The method according to claim 8, wherein the second sub screen displays a content related to the advertising program displayed on the first sub screen.

10. The method according to claim 8, wherein the second sub screen displays an advertising program other than the advertising program displayed on the first sub screen.

11. The method according to claim 1, wherein the splitting of the display screen into the first screen and the second screen includes detecting the advertising program using detection information on black frame and scene change, from video data within a broadcast signal including the broadcasting program.

12. The method according to claim 1, wherein the splitting of the display screen into the first screen and the second screen includes detecting the advertising program using detection information on audio silence, from audio data within a broadcast signal including the broadcasting program.

13. The method according to claim 1, wherein the splitting of the display screen into the first screen and the second screen includes detecting the advertising program for an advertisement detection period set based on electronic program guide information, from data within a broadcast signal including the broadcasting program.

14. The method according to claim 1, wherein the splitting of the display screen into the first screen and the second screen includes:
    detecting the advertising program using detection information on black frame and scene change from video data and detection information on audio silence from audio data; and
    detecting the advertising program for an advertisement detection period set based on electronic program guide information, from data within a broadcast signal including the broadcasting program.

15. The method according to claim 1, wherein the displaying the predetermined content on the first screen includes displaying at least one of a broadcasting program of another channel, a downloaded application, an external video, a recorded video, a web site, or a social media service on the first screen.

16. The method according to claim 1, wherein the displaying the predetermined content on the first screen includes displaying a content having a same attribute as that of a broadcasting program prior to screen split, on the first screen.

17. The method according to claim 1, wherein the displaying the predetermined content on the first screen includes displaying a content having a same genre as that of a broadcasting program prior to screen split, on the first screen.

18. The method according to claim 1, wherein the displaying the predetermined content on the first screen includes displaying a content having a highest ratings on the first screen by detecting xml type real-time ratings data.

19. The method according to claim 1, wherein the displaying the predetermined content on the first screen includes displaying a content having a search keyword of a highest priority on the first screen by detecting xml type real-time popular search keyword data.

20. A multimedia device, which includes a display screen of a predetermined picture ratio, the multimedia device comprising:
- a receiver that receives a digital broadcast signal that includes a broadcasting program and an advertising program;
- a decoder that decodes the digital broadcast signal; and
- an advertising/broadcasting program switching module that splits the display screen into a first screen and a second screen if the advertising program is detected from a current channel, displays the advertising program of the current channel on the second screen and at the same time displays a predetermined content on the first screen, incorporates the first and second screens into one screen if the advertising program ends from the current channel, and displays the broadcasting program of the current channel on the one screen, wherein the advertising/broadcasting program switching module includes a user interface manager, wherein when the advertising program is detected from the current channel, the user interface manager provides on the display screen a first message window as to whether to perform a screen split, and wherein when the advertising program ends from the current channel, the user interface manager provides on the display screen a second message window as to whether to maintain the screen split.

* * * * *